US012634614B2

(12) United States Patent
Luzinski et al.

(10) Patent No.: US 12,634,614 B2
(45) Date of Patent: May 19, 2026

(54) WIRELESS POWER TRANSFER SYSTEM FOR WEARABLE COMMUNICATION DEVICES

(71) Applicant: NuCurrent, Inc., Chicago, IL (US)

(72) Inventors: Jason Luzinski, Chicago, IL (US);
Alberto Peralta, Chicago, IL (US);
Rob Diebold, LaGrange, IL (US)

(73) Assignee: NuCurrent, Inc., Chicago, IL (US)

( * ) Notice: Subject to any disclaimer, the term of this patent is extended or adjusted under 35 U.S.C. 154(b) by 611 days.

(21) Appl. No.: 17/976,020

(22) Filed: Oct. 28, 2022

(65) Prior Publication Data

US 2024/0147122 A1      May 2, 2024

(51) Int. Cl.
*H02J 7/00* (2006.01)
*H02J 50/00* (2016.01)
(Continued)

(52) U.S. Cl.
CPC ........ *H04R 1/1025* (2013.01); *H02J 7/00034* (2020.01); *H02J 50/005* (2020.01);
(Continued)

(58) Field of Classification Search
CPC .. H04R 1/1025; H04R 1/1008; H04R 5/0335; H02J 50/005; H02J 50/20; H02J 7/00034; H04B 5/79
(Continued)

(56) References Cited

U.S. PATENT DOCUMENTS 10,008,875 B1    6/2018   Leabman
11,056,926 B2    7/2021   Choi et al.
(Continued)

FOREIGN PATENT DOCUMENTS

CN        104467129 A      3/2015
CN        110114956 A      8/2019
(Continued)

OTHER PUBLICATIONS

Joao Martins, NFC Forum Wireless Charging Specification 2.0 Allows Charging TWS Earbuds From Smartphones, Oct. 20, 2021, Audioxpress, <https://audioxpress.com/news/nfc-forum-wireless-charging-specification-2-0-allows-charging-tws-earbuds-from-smartphones > (Year: 2021).*
(Continued)

*Primary Examiner* — Zixuan Zhou
(74) *Attorney, Agent, or Firm* — Lee Sullivan Shea & Smith LLP

(57)          ABSTRACT

A wireless power transfer system, for charging a wearable communication device, includes a headset, which includes a headband, at least one earcup, and a receiver antenna configured to receive a power signal, wherein the receiver antenna is positioned proximate to or within the headset. The system further includes a charging base, which includes a transmission antenna, configured to transmit the power signal to the receiver antenna, and a housing. The housing includes a support arm and a base, wherein the transmission antenna is positioned proximate to or within one or more of the support arm, the base, and combinations thereof, and wherein the support arm is configured to retain the headband and position the receiving antenna to receive the power signal from the transmitting antenna.

20 Claims, 31 Drawing Sheets

(51) Int. Cl.

| | |
|---|---|
| *H02J 50/20* | (2016.01) |
| *H04B 5/79* | (2024.01) |
| *H04R 1/10* | (2006.01) |
| *H04R 1/1025* | (2026.01) |

(52) U.S. Cl.
CPC .............. *H02J 50/20* (2016.02); *H04B 5/79* (2024.01); *H04R 1/1008* (2013.01)

(58) Field of Classification Search
USPC .......................................... 320/108; 307/104
See application file for complete search history.

(56) References Cited

U.S. PATENT DOCUMENTS

| | | | |
|---|---|---|---|
| 11,121,580 | B2 | 9/2021 | Partovi et al. |
| 2005/0254778 | A1 | 11/2005 | Pettersen et al. |
| 2010/0062731 | A1 | 3/2010 | Ham et al. |
| 2011/0141357 | A1 | 6/2011 | Price et al. |
| 2011/0306393 | A1 | 12/2011 | Goldman et al. |
| 2013/0223640 | A1 | 8/2013 | Urano et al. |
| 2016/0020639 | A1 | 1/2016 | Pudipeddi et al. |
| 2016/0087486 | A1 | 3/2016 | Pogorelik et al. |
| 2016/0259374 | A1 | 9/2016 | Breiwa et al. |
| 2017/0033567 | A1 | 2/2017 | Adamisin |
| 2017/0359645 | A1 | 12/2017 | Chen et al. |
| 2018/0175655 | A1 | 6/2018 | Liu |
| 2020/0007971 | A1* | 1/2020 | Park .................... H04R 1/1008 |
| 2020/0162807 | A1 | 5/2020 | Lim |
| 2021/0089265 | A1* | 3/2021 | van Erven ............... H04R 1/10 |
| 2022/0386013 | A1 | 12/2022 | Kelley et al. |
| 2023/0036419 | A1 | 2/2023 | Giffen et al. |

FOREIGN PATENT DOCUMENTS

| | | |
|---|---|---|
| CN | 209659549 U | 11/2019 |
| CN | 115411804 A | 11/2022 |
| KR | 101620628 B1 | 5/2016 |
| KR | 20170006280 A | 1/2017 |
| KR | 20170002340 U | 6/2017 |
| KR | 20180072532 A | 6/2018 |
| WO | 2013142840 A1 | 9/2013 |

OTHER PUBLICATIONS

International Searching Authority, PCT International Search Report and Written Opinion, PCT International Application No. PCT/US2023/078084 dated Feb. 27, 2024, 11 pages.

Luo, Alex, "NFC Wireless Charging: The Future of Charging Small Devices", NXP, 2020, 16 pages.

* cited by examiner

FIG. 22A　　　　FIG. 22B

WIRELESS POWER TRANSFER SYSTEM FOR WEARABLE COMMUNICATION DEVICES

TECHNICAL FIELD

The present disclosure generally relates to systems and methods for wireless transfer of electrical power and/or electrical data signals, and, more particularly, to systems and methods for efficiently charging and recharging a wearable communication device.

BACKGROUND

Headphones and headsets (wearable communication devices) have changed the way users interact with electronic devices of all types from mobile devices (e.g., music players, cellphones, laptops computers) to non-mobile desktop and console systems. Headphones and headsets traditionally were connected to a device via a cable that provided power and facilitated the transfer of signals and/or data. With the development of wireless technologies (e.g., Bluetooth (BLE). WIFI, 2.4 gigahertz (GHz), among other wireless technologies), wireless wearable communication devices have evolved from the first single ear devices, primarily meant for use with a mobile phone, to sophisticated headsets and pairs of in-ear devices packed with technology and features.

While modern wireless wearable communication devices include various technical advances, they all have the problem of needing to be recharged. Larger wireless wearable communication devices (e.g., over-the-ear headsets) mostly have connectors for a power cable or they have exposed electrical contacts that connect to exposed electrical contacts on a model-specific charging base.

Both cable connections and exposed electrical contacts have significant drawbacks. Cable connectors are prone to damage and wear. Exposed electrical contacts are prone to corrosion and dirt interrupting the connection along with the hassle of only charging with the specific base or case. Both cable connections and exposed electrical contacts are potential sources for liquid intrusion. Further, both cable connections and exposed electrical contacts require the user to remember to charge the wearable communication device by making a physical connection to a power source when they are done using the device.

SUMMARY

Wireless power transfer systems provide an opportunity to overcome the above-mentioned deficiencies for charging wearable communication devices.

To that end, wireless connection systems are used in a variety of applications for the wireless transfer of electrical energy, electrical power, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmitting and receiving elements will often take the form of coiled wires and/or antennas.

Transmission of one or more of electrical energy, electrical power, electromagnetic energy and/or electronic data signals from one such coiled antenna to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards body requirements (e.g., electromagnetic interference (EMI) requirements, specific absorption rate (SAR) requirements, among other things), bill of materials (BOM) limitations, and/or form factor constraints, among other things. It is to be noted that, "self-resonating frequency," as known to those having skill in the art, generally refers to the resonant frequency of a passive component (e.g., an inductor) due to the parasitic characteristics of the component.

When such systems operate to wirelessly transfer power from a transmission system to a receiver system, via the coils and/or antennas, it is often desired to simultaneously or intermittently communicate electronic data from one system to the other. The efficient transfer of power and data may be affected by the location and stability of one or both of the sending and receiving antennas.

To that end, efficient wireless power transfer systems that may be adapted for charging wearable communication devices represent a significant improvement in device capability and user experience.

Wireless power transfer systems configured for providing power and data to a wearable communication device are disclosed in the present application. The systems comprise a transmitter base configured to support or enclose a wearable communication device, which includes a wireless power receiver. Several embodiments of transmitting bases are disclosed. To that end, a transmitting base is provided for supporting a wireless headset on a desktop. A transmitter coil in the transmitting base is aligned with a receiver coil in the wireless headset when the wireless headset is supported by the base. Another embodiment of a transmitting base is provided for supporting a wireless headset below a desktop surface while still providing for alignment of transmitting and receiving coils for the wireless transfer of power. A further embodiment of a transmitting base is provided that encloses a wireless headset while still providing for alignment of NFC coils for wireless transfer of power.

An embodiment of a wireless headset (wearable communication device) that includes a wireless receiver system having the receiving coil located in a headband is disclosed. A further embodiment of a wireless headset that includes a wireless receiver system having the receiving coil located in an earcup is also disclosed. A further embodiment of a wireless receiver system having the receiving coil located in a dongle for attaching to a wireless headset having a connector and configured to be charged via connection is disclosed.

By way of example, the disclosed wireless power transfer systems may be utilized by computer users for professional or personal purposes to charge a wireless headset when the headset is not in use without having to remember to connect a charging cable. The headset will charge anytime it is removed by a user and placed proximate to a charging base. Placing the headset proximate the charging base for charging, even if only for a short duration break, would be effortless as compared to connecting a charging cable.

In an additional or alternative example, the system could include a base configured to charge multiple units for applications where many headsets may be regularly distributed. For example, a museum may charge many headsets on a base comprising many transmitter coils for headsets that are given out to patrons participating in a walking audio tour. Wireless charging would prevent wearing out or damage to a wired charging connector that is used in a commercial environment and subject to an increased number of connection cycles.

In accordance with an aspect of the disclosure, a wireless power transfer system, for charging a wearable communication device, is disclosed. The system includes a headset, which includes a headband, at least one earcup, and a receiver antenna configured to receive a power signal, wherein the receiver antenna is positioned proximate to or within the headset. The system further includes a charging base, which includes a transmission antenna, configured to transmit the power signal to the receiver antenna, and a housing. The housing includes a support arm and a base, wherein the transmission antenna is positioned proximate to or within one or more of the support arm, the base, and combinations thereof, and wherein the support arm is configured to retain the headband and position the receiving antenna to receive the power signal from the transmitting antenna.

In a refinement, the receiving antenna couples at an operating frequency in a range of about 13.553 MHz to about 13.567 MHz.

In a refinement, an output power of the transmitting antenna is greater than about 1 Watt.

In a refinement, the at least one earcup includes at least one electroacoustic transducer.

In a further refinement, the at least one electroacoustic transducer comprises one or more of a speaker and a microphone.

In a refinement, the headset is configurable for use with at least one of a mobile electronic device and a non-mobile electronic device.

In a refinement, the at least one earcup is configured as one of an on-ear earcup and an around-ear earcup.

In a refinement, the at least one earcup includes a first earcup and a second opposed earcup.

In accordance with another aspect of the disclosure, a Near-Field Communications Wireless Charging (NFC-WC) system, for charging a wearable communication device, is disclosed. The system includes a headset, which includes a headband, at least one earcup, and an NFC-WC receiving antenna configured to receive a power signal, wherein the NFC-WE receiving antenna is positioned proximate to or within the wireless headset. The system further includes a charging station including an NFC-DC transmitting antenna, configured to transmit the power signal to the NFC-DC receiving antenna, and a housing. The housing includes at least a support arm and a support base, wherein the NFC-DC transmitting antenna is positioned proximate to or within one or more of the support arm, the support base, and combinations thereof, and wherein the support arm is configured to retain the headband and position the NFC-DC receiving antenna to receive the power signal from the NFC-DC transmitting antenna.

In a refinement, the NFC-WC receiving antenna couples at an operating frequency in a range of about 13.553 MHz to about 13.567 MHz.

In a refinement, an output power of the NFC-WC transmitting antenna is greater than about 1 Watt.

In a refinement, the at least one earcup includes at least one electroacoustic transducer.

In a further refinement, the at least one electroacoustic transducer comprises one or more of a speaker and a microphone.

In a refinement, the headset is configurable for use with at least one of a mobile electronic device and a non-mobile electronic device.

In a refinement, the at least one earcup is configured as one of an on-ear earcup and an around-ear earcup.

In a refinement, the at least one earcup includes a first earcup and a second opposed earcup.

In accordance with yet another aspect of the disclosure, a wireless power transfer system is disclosed. The system includes a wireless headset for use with an electronic device, which includes a headband, at least one earcup, and a receiving antenna configured to receive a power signal, wherein the receiving antenna is positioned proximate to or within the wireless headset. The system further includes a charging base configured to charge the wireless headset, which includes a transmitting antenna, configured to transmit the power signal to the receiving antenna, and a housing. The housing includes a support arm, wherein the transmitting antenna is positioned proximate to or within one or more of the support arm, the base, and combinations thereof, and wherein the support arm is configured to retain the headband of the wireless headset and position the receiving antenna to receive the power signal from the transmitting antenna.

In a refinement, the receiving antenna couples at an operating frequency in a range of about 13.553 MHz to about 13.567 MHz.

In a refinement, an output power of the transmitting antenna is greater than about 1 Watt.

In a refinement, the electronic device comprises at least one of at least a mobile electronic device.

These and other aspects and features of the present disclosure will be better understood when read in conjunction with the accompanying drawings.

BRIEF DESCRIPTION OF THE DRAWINGS

FIG. 22A is a side view of the charging hook of FIG. 18A, as an embedded device of an electronic device, in its "folded-in" position, in accordance with FIGS. 1-7, 9-21F, and the present disclosure.

FIG. 22B is a side view of the charging hook of FIG. 18A, as an embedded device of an electronic device, in its "folded-out" position, in accordance with FIGS. 1-7, 9-22A, and the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Wireless charging for wearable communication devices (e.g., headsets, earphones, earbuds) is desired. However, as noted above, the efficient wireless transfer of power and data may be affected by the location and stability of one or both of the sending and receiving antennas. Moreover, when a wearable communication device is being wirelessly charged, it may be inconvenient for the user to assure alignment of the wearable communication device and the charging base. For example, it would be inconvenient to require a user to precisely align the wearable communication device on the charging base, in order to maintain the devices aligned and located for charging and data exchange.

Figure 1:
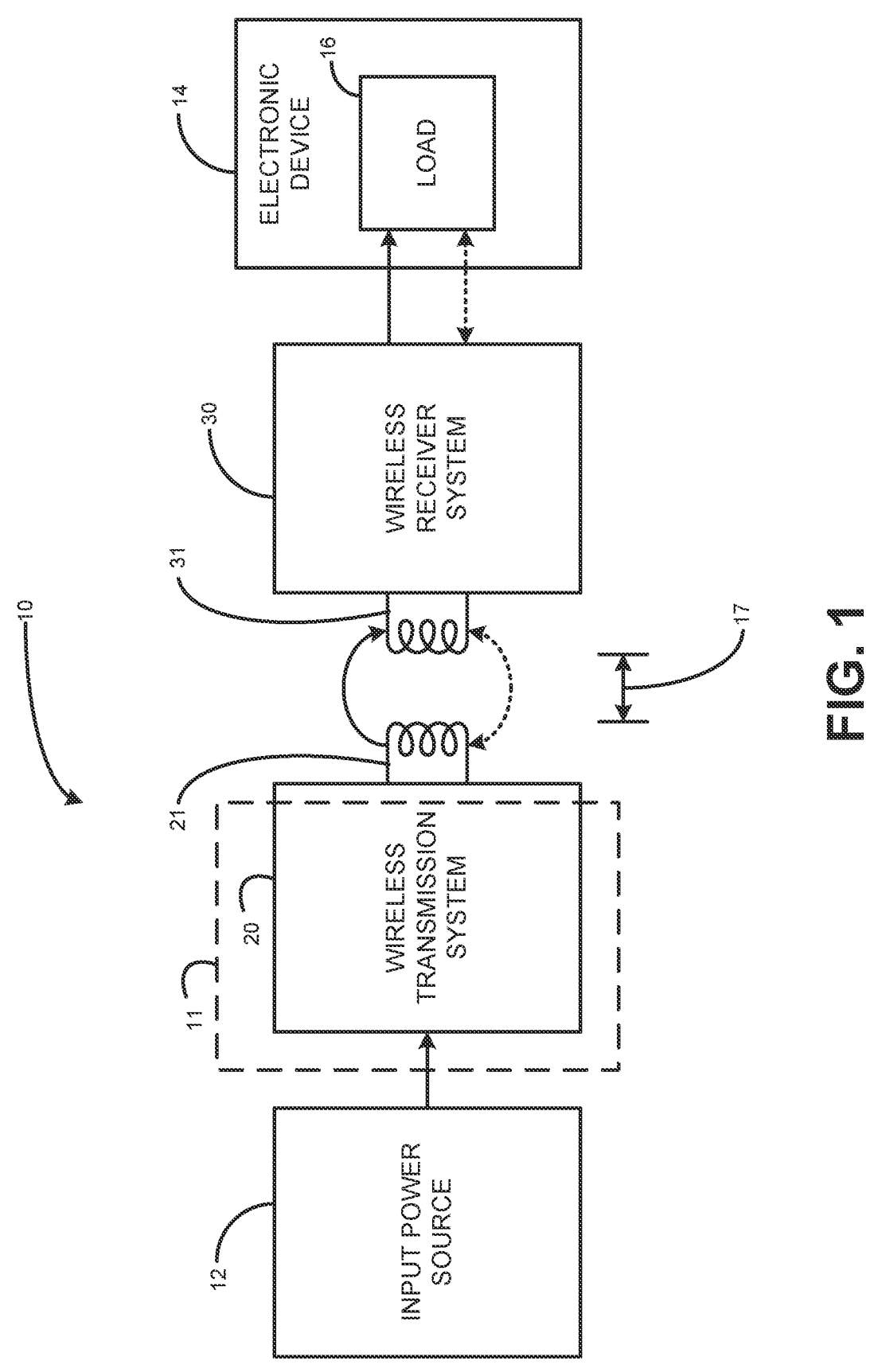
FIG. 1 is a block diagram of an embodiment of a system for wirelessly transferring one or more of electrical energy, electrical power signals, electrical power, electromagnetic energy, electronic data, and combinations thereof, in accordance with the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium.

The wireless power transfer system 10 provides for the wireless transmission of electrical signals via near field magnetic coupling. As shown in the embodiment of FIG. 1, the wireless power transfer system 10 includes a wireless transmission system 20 and a wireless receiver system 30. The wireless receiver system is configured to receive electrical signals from, at least, the wireless transmission system 20. In some examples, such as examples wherein the wireless power transfer system is configured for wireless power transfer via the Near Field Communications Direct Charge (NFC-DC) or Near Field Communications Wireless Charging (NFC WC) draft or accepted standard, the wireless transmission system 20 may be referenced as a "listener" of the NFC-DC wireless transfer system 20 and the wireless receiver system 30 may be referenced as a "poller" of the NFC-DC wireless transfer system.

As illustrated, the wireless transmission system 20 and wireless receiver system 30 may be configured to transmit electrical signals across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, a mechanical wall, among other things; however, there is no physical, electrical connection at such a separation distance or gap.

Thus, the combination of the wireless transmission system 20 and the wireless receiver system 30 create an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

In some cases, the gap 17 may also be referenced as a "Z-Distance," because, if one considers an antenna 21, 31 each to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when the wireless transmission system 20 and the wireless receiver system 30 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k), that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, the wireless transmission system 20 may be associated with a host device 11, which may receive power from an input power source 12. The host device 11 may be any electrically operated device, circuit board, electronic assembly, dedicated charging device, or any other contemplated electronic device. Example host devices 11, with which the wireless transmission system 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

As illustrated, one or both of the wireless transmission system 20 and the host device 11 are operatively associated with an input power source 12. The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

Electrical energy received by the wireless transmission system 20 is then used for at least two purposes: to provide electrical power to internal components of the wireless transmission system 20 and to provide electrical power to the transmitter antenna 21. The transmitter antenna 21 is configured to wirelessly transmit the electrical signals conditioned and modified for wireless transmission by the wireless transmission system 20 via near-field magnetic coupling (NFMC). Near-field magnetic coupling enables the transfer of signals wirelessly through magnetic induction between the transmitter antenna 21 and a receiving antenna 31 of, or associated with, the wireless receiver system 30. Near-field magnetic coupling may be and/or be referred to as "inductive coupling," which, as used herein, is a wireless power transmission technique that utilizes an alternating electromagnetic field to transfer electrical energy between two antennas. Such inductive coupling is the near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmitter antenna 21 or the receiver antenna 31 are strategically positioned to facilitate reception and/or transmission of wirelessly transferred electrical signals through near field magnetic induction. Antenna operating frequencies may comprise relatively high operating frequency ranges, examples of which may include, but are not limited to, 6.78 MHz (e.g., in accordance with the Rezence and/or Airfuel interface standard and/or any other proprietary interface standard operating at a frequency of 6.78 MHz), 13.56 MHz (e.g., in accordance with the NFC standard, defined by ISO/IEC standard 18092), 27 MHz, and/or an operating frequency of another proprietary operating mode. The operating frequencies of the antennas 21, 31 may be operating frequencies designated by the International Telecommunications Union (ITU) in the Industrial, Scientific, and Medical (ISM) frequency bands, including not limited to 6.78 MHz, 13.56 MHz, and 27 MHz, which are designated for use in wireless power transfer. In systems wherein the wireless power transfer system 10 is operating within the NFC-DC standards and/or draft standards, the operating frequency may be in a range of about 13.553 MHz to about 13.567 MHz.

The transmitting antenna and the receiving antenna of the present disclosure may be configured to transmit and/or receive electrical power having a magnitude that ranges from about 10 milliwatts (mW) to about 500 watts (W). In one or more embodiments the inductor coil of the transmitting antenna 21 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 30 may be associated with at least one electronic device 14, wherein the electronic device 14 may be any device that requires electrical power for any function and/or for power storage (e.g., via a battery and/or capacitor). Additionally, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless power transfer, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 2:
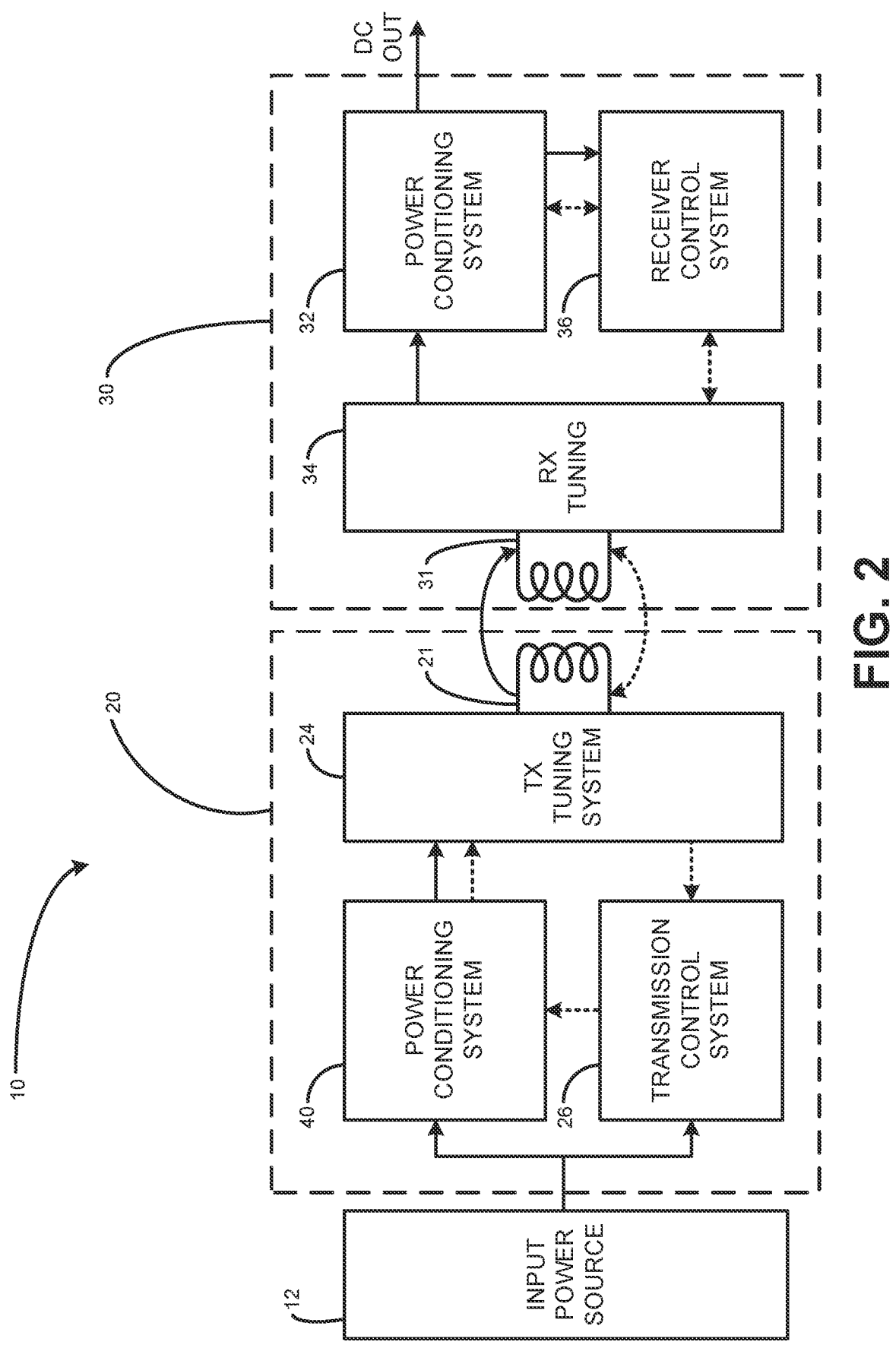
FIG. 2 is a block diagram illustrating components of a wireless transmission system of the system of FIG. 1 and a wireless receiver system of the system of FIG. 1, in accordance with FIG. 1 and the present disclosure.

Turning now to FIG. 2, the wireless connection system 10 is illustrated as a block diagram including example subsystems of both the wireless transmission system 20 and the wireless receiver system 30. The wireless transmission system 20 may include, at least, a power conditioning system 40, a transmission control system 26, a transmission tuning system 24, and the transmission antenna 21. A first portion of the electrical energy input from the input power source 12 is configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

Figure 3:
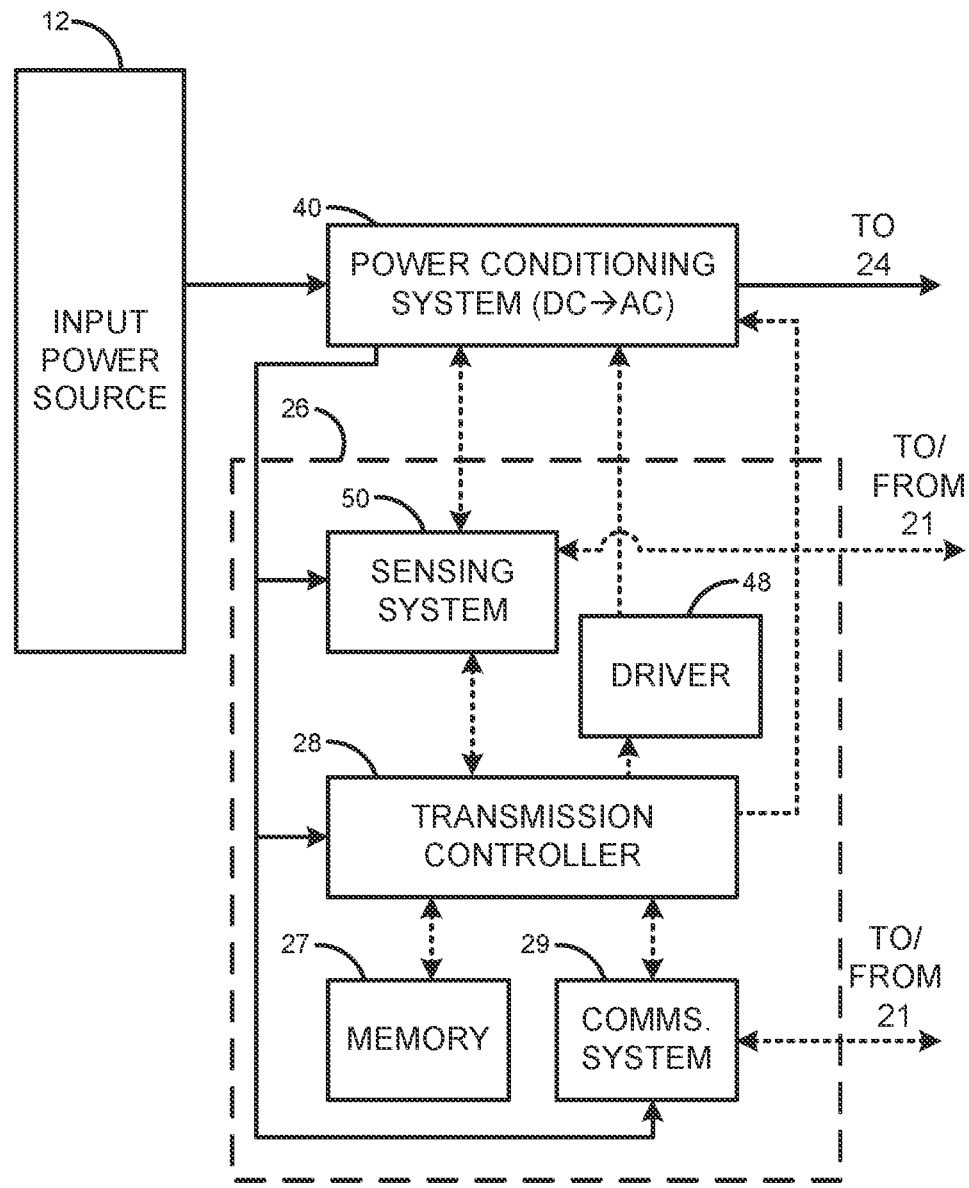
FIG. 3 is a block diagram illustrating components of a transmission control system of the wireless transmission system of FIG. 2, in accordance with FIG. 1, FIG. 2, and the present disclosure.

Referring now to FIG. 3, with continued reference to FIGS. 1 and 2, subcomponents and/or systems of the transmission control system 26 are illustrated. The transmission control system 26 may include a sensing system 50, a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. In some examples, PWM signal may be configured to generate a duty cycle for the AC power signal output by the power conditioning system 40. In some such examples, the duty cycle may be configured to be about 50% of a given period of the AC power signal.

The sensing system may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof.

Figure 4:
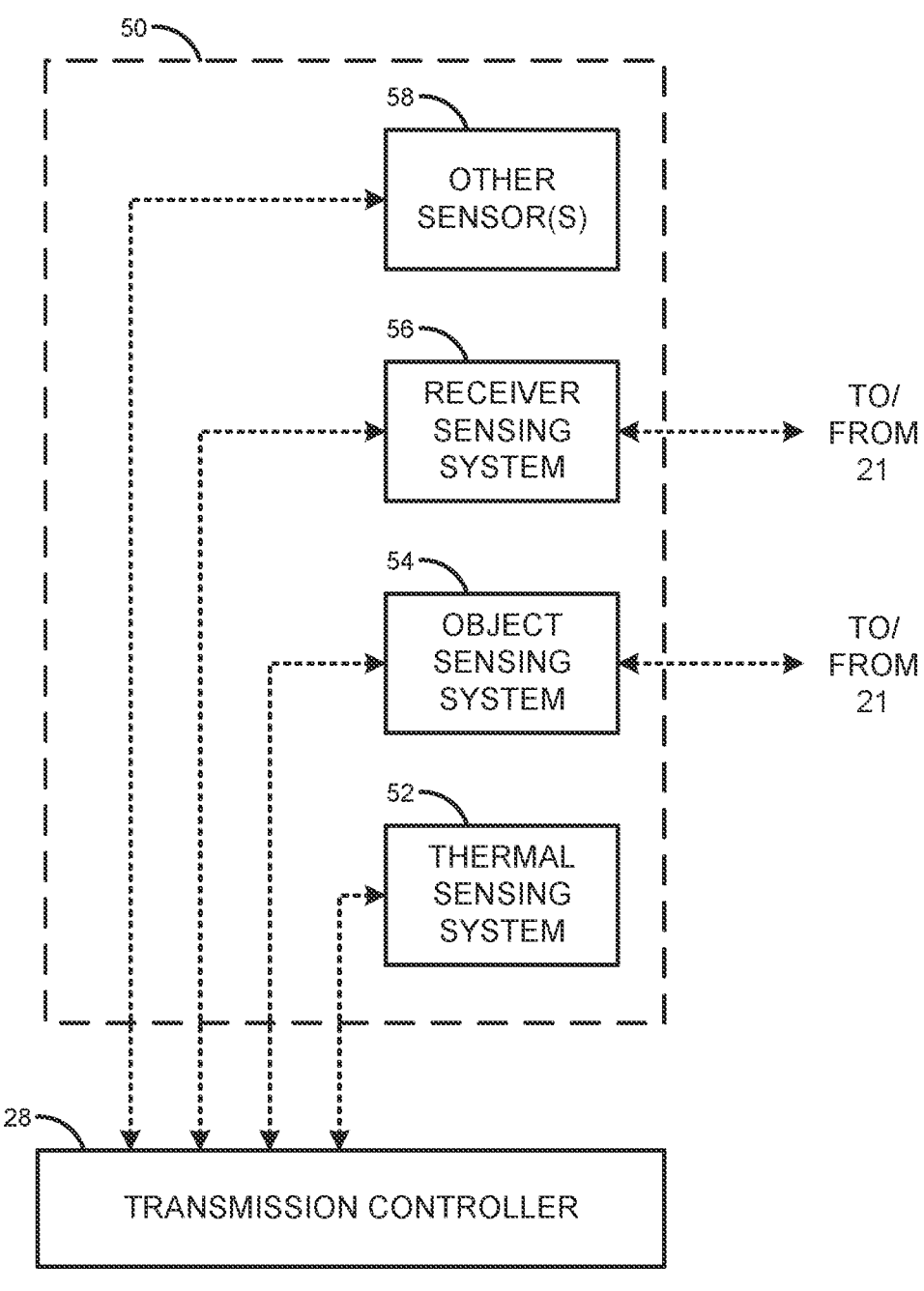
FIG. 4 is a block diagram illustrating components of a sensing system of the transmission control system of FIG. 3, in accordance with FIGS. 1-3 and the present disclosure.

As illustrated in the embodiment of FIG. 4, the sensing system 50 may include, but is not limited to including, a thermal sensing system 52, an object sensing system 54, a receiver sensing system 56, and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 200 Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect one or more of the wireless receiver system 30 and/or the receiver antenna 31, thus indicating to the transmission controller 28 that the receiver system 30 is proximate to the wireless transmission system 20. Additionally or alternatively, the object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 20 against a known, acceptable electrical impedance value or range of electrical impedance values.

Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the wireless transmission system 20. In some examples, the receiver sensing system 56 and the object sensing system 54 may be combined, may share components, and/or may be embodied by one or more common components. In some examples, if the presence of any such wireless receiving system is detected, wireless transmission of electrical energy, electrical power, electromagnetic energy, and/or data by the wireless transmission system 20 to said wireless receiving system is enabled. In some examples, if the presence of a wireless receiver system is not detected, continued wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 5:
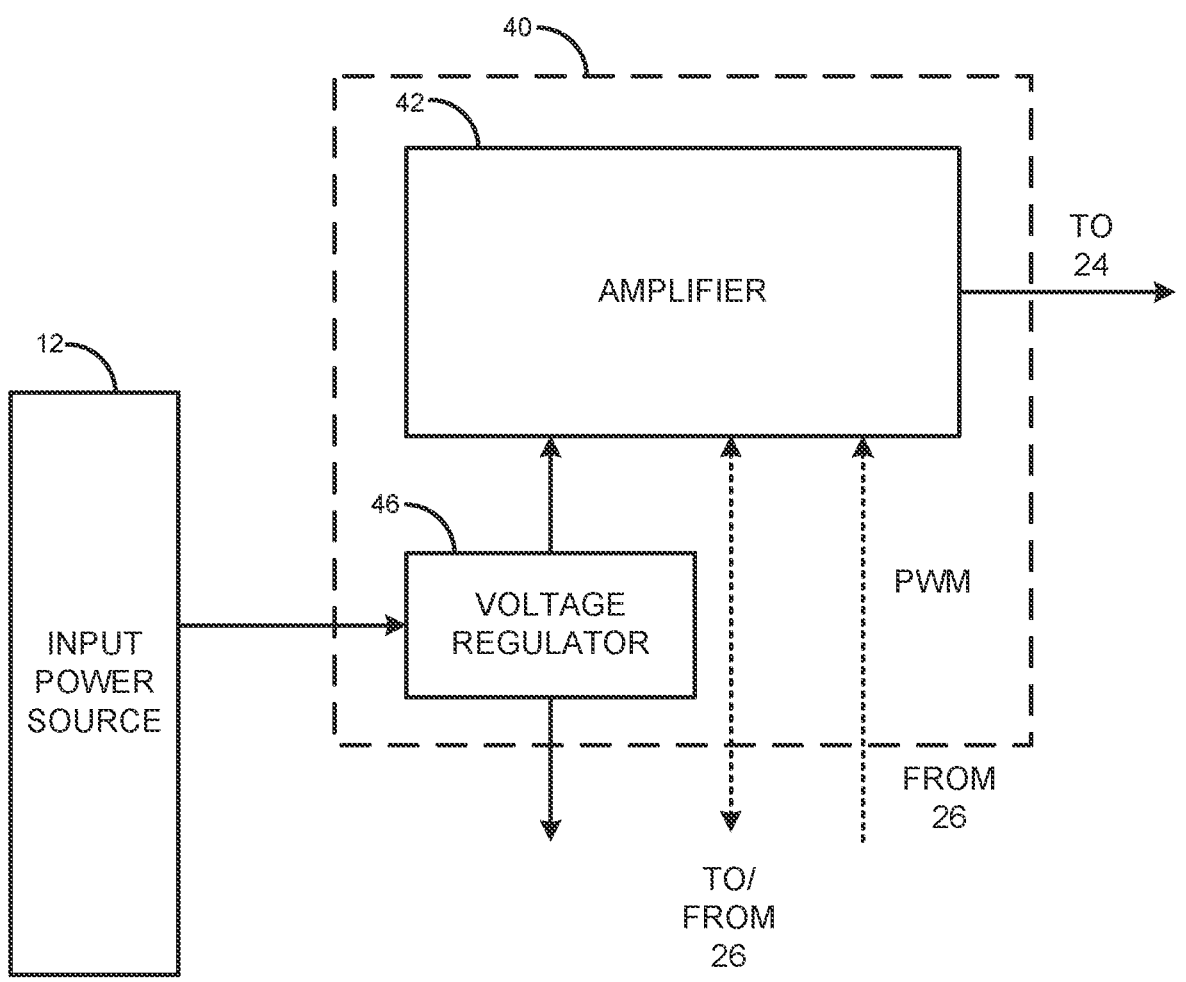
FIG. 5 is a block diagram illustrating components of a power conditioning system of the wireless transmission system of FIG. 2, in accordance with FIG. 1, FIG. 2, and the present disclosure.

Referring now to FIG. 5, and with continued reference to FIGS. 1-4, a block diagram illustrating an embodiment of the power conditioning system 40 is illustrated. At the power conditioning system 40, electrical power is received, generally, as a DC power source, via the input power source 12 itself or an intervening power converter, converting an AC source to a DC source (not shown). A voltage regulator 46 receives the electrical power from the input power source 12 and is configured to provide electrical power for transmission by the antenna 21 and provide electrical power for powering components of the wireless transmission system 20. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an invertor, which receives an input DC power signal from the voltage regulator 46 and generates an AC as output, based, at least in part, on PWM input from the transmission control system 26. The amplifier 42 may be or include, for example, a power stage invertor, such as a dual field effect transistor power stage invertor or a quadruple field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 500 W. In some examples, the amplifier 42 may be or may include one or more class-E power amplifiers. Class-E power amplifiers are efficiently tuned switching power amplifiers designed for use at high frequencies (e.g., frequencies from about 1 MHz to about 1 GHz). Generally, a class-E amplifier employs a single-pole switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, and/or a push-pull invertor, among other amplifiers that could be included as part of the amplifier 42.

Figure 6:
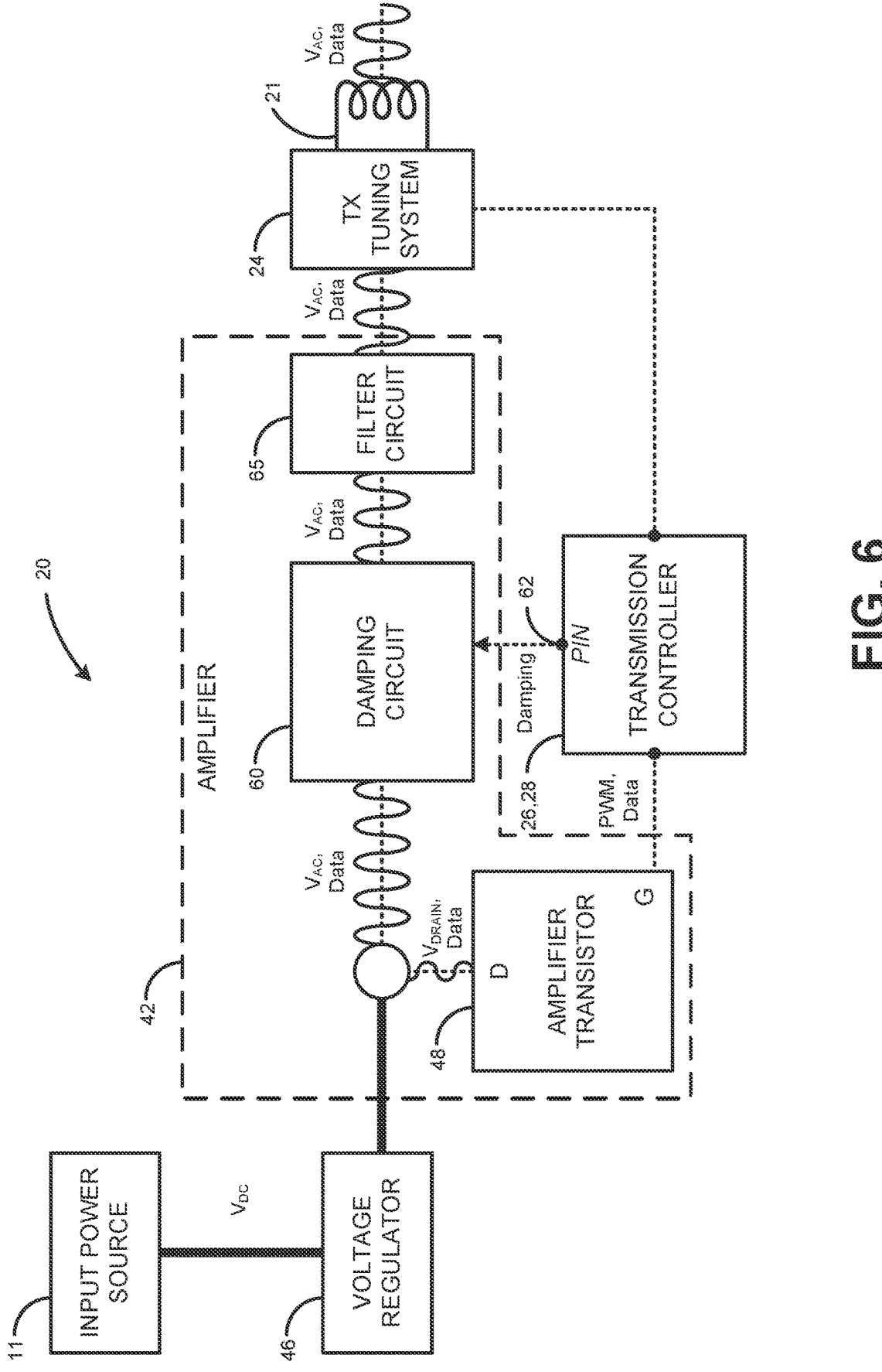
FIG. 6 is a block diagram of elements of the wireless transmission system of FIGS. 1-5, further illustrating components of an amplifier of the power conditioning system of FIG. 5 and signal characteristics for wireless power transmission, in accordance with FIGS. 1-5 and the present disclosure.
Figure 7:
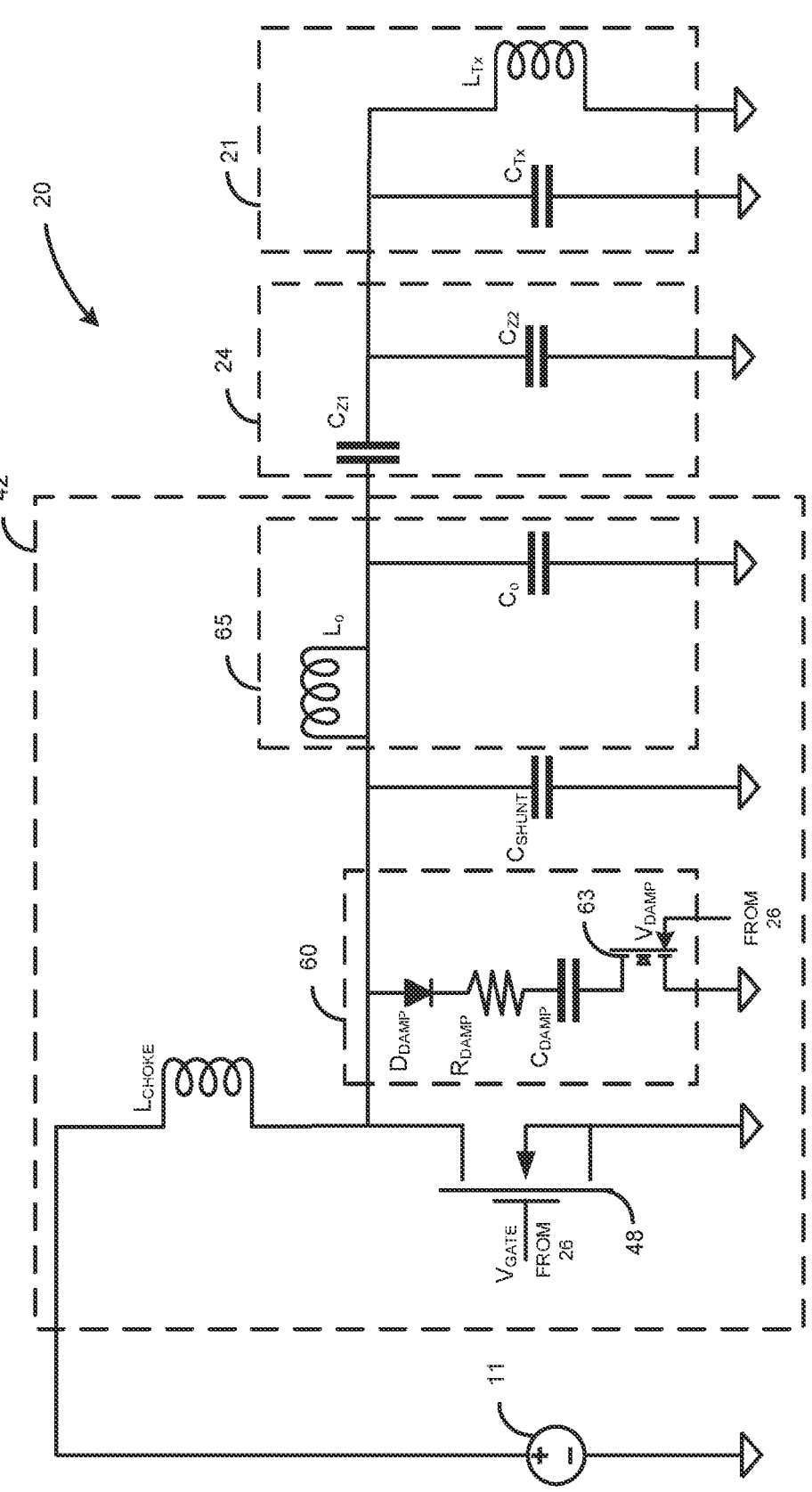
FIG. 7 is an electrical schematic diagram of elements of the wireless transmission system of FIGS. 1-6, further illustrating components of an amplifier of the power conditioning system of FIGS. 5-6, in accordance with FIGS. 1-6 and the present disclosure.

Turning now to FIGS. 6 and 7, the wireless transmission system 20 is illustrated, further detailing elements of the power conditioning system 40, the amplifier 42, the tuning system 24, among other things. The block diagram of the wireless transmission system 20 illustrates one or more electrical signals and the conditioning of such signals, altering of such signals, transforming of such signals, inverting of such signals, amplification of such signals, and combinations thereof. In FIG. 6, DC power signals are illustrated with heavily bolded lines, such that the lines are significantly thicker than other solid lines in FIG. 6 and other figures of the instant application, AC signals are illustrated as substantially sinusoidal wave forms with a thickness significantly less bolded than that of the DC power signal bolding, and data signals are represented as dotted lines. It is to be noted that the AC signals are not necessarily substantially sinusoidal waves and may be any AC waveform suitable for the purposes described below (e.g., a half sine wave, a square wave, a half square wave, among other waveforms). FIG. 7 illustrates sample electrical components for elements of the wireless transmission system, and subcomponents thereof, in a simplified form. Note that FIG. 7 may represent one branch or sub-section of a schematic for the wireless transmission system 20 and/or components of the wireless transmission system 20 may be omitted from the schematic illustrated in FIG. 7 for clarity.

As illustrated in FIG. 6 and discussed above, the input power source 11 provides an input direct current voltage ($V_{DC}$), which may have its voltage level altered by the voltage regulator 46, prior to conditioning at the amplifier 42. In some examples, as illustrated in FIG. 7, the amplifier 42 may include a choke inductor $L_{CHOKE}$, which may be utilized to block radio frequency interference in $V_{DC}$, while allowing the DC power signal of $V_{DC}$ to continue towards an amplifier transistor 48 of the amplifier 42. $V_{CHOKE}$ may be configured as any suitable choke inductor known in the art.

The amplifier 48 is configured to alter and/or invert $V_{DC}$ to generate an AC wireless signal $V_{AC}$, which, as discussed in more detail below, may be configured to carry one or both of an inbound and outbound data signal (denoted as "Data" in FIG. 6). The amplifier transistor 48 may be any switching transistor known in the art that is capable of inverting, converting, and/or conditioning a DC power signal into an AC power signal, such as, but not limited to, a field-effect transistor (FET), gallium nitride (GaN) FETS, bipolar junction transistor (BJT), and/or wide-bandgap (WBG) semiconductor transistor, among other known switching transistors. The amplifier transistor 48 is configured to receive a driving signal (denoted as "PWM" in FIG. 6) from at a gate of the amplifier transistor 48 (denoted as "G" in FIG. 6) and invert the DC signal $V_{DC}$ to generate the AC wireless signal at an operating frequency and/or an operating frequency band for the wireless power transmission system 20. The driving signal may be a PWM signal configured for such inversion at the operating frequency and/or operating frequency band for the wireless power transmission system 20.

The driving signal is generated and output by the transmission control system 26 and/or the transmission controller 28 therein, as discussed and disclosed above. The transmission controller 26, 28 is configured to provide the driving signal and configured to perform one or more of encoding wireless data signals (denoted as "Data" in FIG. 6), decoding the wireless data signals (denoted as "Data" in FIG. 6) and any combinations thereof. In some examples, the electrical data signals may be in band signals of the AC wireless power signal. In some such examples, such in-band signals may be on-off-keying (OOK) signals in-band of the AC wireless power signals. For example, Type-A communications, as described in the NFC Standards, are a form of OOK, wherein the data signal is on-off-keyed in a carrier AC wireless power signal operating at an operating frequency in a range of about 13.553 MHz to about 13.567 MHz.

However, when the power, current, impedance, phase, and/or voltage levels of an AC power signal are changed beyond the levels used in current and/or legacy hardware for high frequency wireless power transfer (over about 500 mW transmitted), such legacy hardware may not be able to properly encode and/or decode in-band data signals with the required fidelity for communications functions. Such higher power in an AC output power signal may cause signal degradation due to increasing rise times for an OOK rise, increasing fall time for an OOK fall, overshooting the required voltage in an OOK rise, and/or undershooting the voltage in an OOK fall, among other potential degradations to the signal due to legacy hardware being ill equipped for higher power, high frequency wireless power transfer. Thus, there is a need for the amplifier 42 to be designed in a way that limits and/or substantially removes rise and fall times, overshoots, undershoots, and/or other signal deficiencies from an in-band data signal during wireless power transfer. This ability to limit and/or substantially remove such deficiencies allows for the systems of the instant application to provide higher power wireless power transfer in high frequency wireless power transmission systems.

Figure 8:
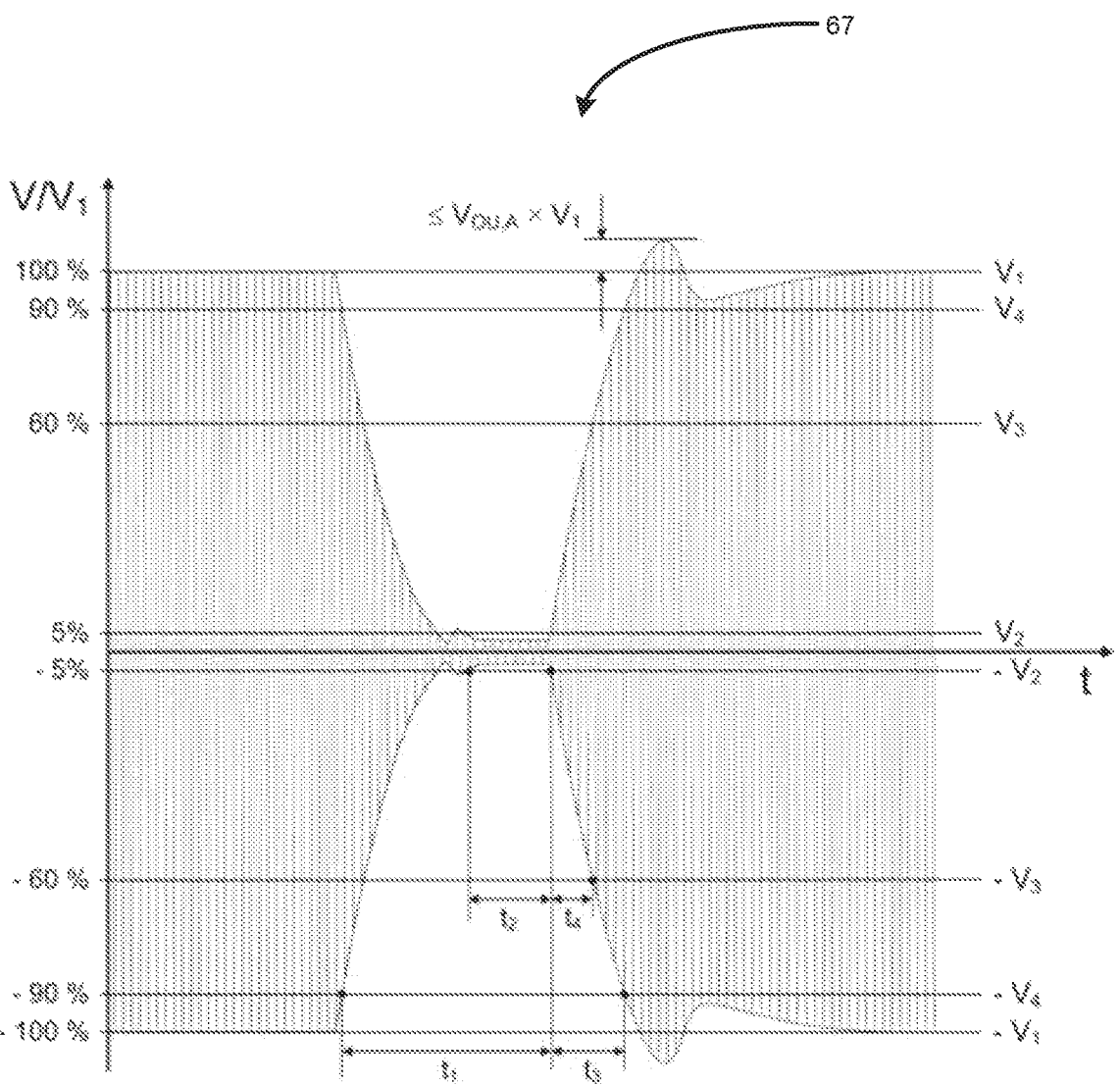
FIG. 8 is an exemplary plot illustrating rise and fall of "on" and "off" conditions when a signal has in-band communications via on-off keying.

For further exemplary illustration, FIG. 8 illustrates a plot for a fall and rise of an OOK in-band signal. The fall time $(t_1)$ is shown as the time between when the signal is at 90% voltage $(V_4)$ of the intended full voltage $(V_1)$ and falls to about 5% voltage $(V_2)$ of $V_1$. The rise time $(t_3)$ is shown as the time between when the signal ends being at $V_2$ and rises to about $V_4$. Such rise and fall times may be read by a receiving antenna of the signal, and an applicable data communications protocol may include limits on rise and fall times, such that data is non-compliant and/or illegible by a receiver if rise and/or fall times exceed certain bounds.

Returning now to FIGS. 6 and 7, to achieve limitation and/or substantial removal of the mentioned deficiencies, the amplifier 42 includes a damping circuit 60. The damping circuit 60 is configured for damping the AC wireless signal during transmission of the AC wireless signal and associated data signals. The damping circuit 60 may be configured to reduce rise and fall times during OOK signal transmission, such that the rate of the data signals may not only be compliant and/or legible, but may also achieve faster data rates and/or enhanced data ranges, when compared to legacy systems. For damping the AC wireless power signal, the damping circuit includes, at least, a damping transistor 63, which is configured for receiving a damping signal $(V_{damp})$ from the transmission controller 62. The damping signal is configured for switching the damping transistor (on/off) to control damping of the AC wireless signal during the transmission and/or receipt of wireless data signals. Such transmission of the AC wireless signals may be performed by the transmission controller 28 and/or such transmission may be via transmission from the wireless receiver system 30, within the coupled magnetic field between the antennas 21, 31.

In examples wherein the data signals are conveyed via OOK, the damping signal may be substantially opposite and/or an inverse to the state of the data signals. This means that if the OOK data signals are in an "on" state, the damping signals instruct the damping transistor to turn "off" and thus the signal is not dissipated via the damping circuit 60 because the damping circuit is not set to ground and, thus, a short from the amplifier circuit and the current substantially bypasses the damping circuit 60. If the OOK data signals are in an "off" state, then the damping signals may be "on" and, thus, the damping transistor 63 is set to an "on" state and the current flowing of $V_{AC}$ is damped by the damping circuit. Thus, when "on," the damping circuit 60 may be configured to dissipate just enough power, current, and/or voltage, such that efficiency in the system is not substantially affected and such dissipation decreases rise and/or fall times in the OOK signal. Further, because the damping signal may instruct the damping transistor 63 to turn "off" when the OOK signal is "on," then it will not unnecessarily damp the signal, thus mitigating any efficiency losses from $V_{AC}$, when damping is not needed.

As illustrated in FIG. 7, the branch of the amplifier 42 which may include the damping circuit 60, is positioned at the output drain of the amplifier transistor 48. While it is not necessary that the damping circuit 60 be positioned here, in some examples, this may aid in properly damping the output AC wireless signal, as it will be able to damp at the node closest to the amplifier transistor 48 output drain, which is the first node in the circuit wherein energy dissipation is desired. In such examples, the damping circuit is in electrical parallel connection with a drain of the amplifier transistor 48. However, it is certainly possible that the damping circuit be connected proximate to the antenna 21, proximate to the transmission tuning system 24, and/or proximate to a filter circuit 24.

While the damping circuit 60 is capable of functioning to properly damp the AC wireless signal for proper communications at higher power high frequency wireless power transmission, in some examples, the damping circuit may include additional components. For instance, as illustrated, the damping circuit 60 may include one or more of a damping diode $D_{DAMP}$, a damping resistor $R_{DAMP}$, a damping capacitor $C_{DAMP}$, and/or any combinations thereof. $R_{DAMP}$ may be in electrical series with the damping transistor 63 and the value of $R_{DAMP}$ (ohms) may be configured such that it dissipates at least some power from the power signal, which may serve to accelerate rise and fall times in an amplitude shift keying signal, an OOK signal, and/or combinations thereof. In some examples, the value of $R_{DAMP}$ is selected, configured, and/or designed such that $R_{DAMP}$ dissipates the minimum amount of power to achieve the fastest rise and/or fall times in an in-band signal allowable and/or satisfy standards limitations for minimum rise and/or fall times; thereby achieving data fidelity at maximum efficiency (less power lost to $R_{DAMP}$) as well as maintaining data fidelity when the system is unloaded and/or under lightest load conditions.

$C_{DAMP}$ may also be in series connection with one or both of the damping transistor 63 and $R_{DAMP}$. $C_{DAMP}$ may be configured to smooth out transition points in an in-band signal and limit overshoot and/or undershoot conditions in such a signal. Further, in some examples, $C_{DAMP}$ may be configured for ensuring the damping performed is 180 degrees out of phase with the AC wireless power signal, when the transistor is activated via the damping signal.

$D_{DAMP}$ may further be included in series with one or more of the damping transistor 63, $R_{DAMP}$, $C_{DAMP}$, and/or any combinations thereof. $D_{DAMP}$ is positioned, as shown, such that a current cannot flow out of the damping circuit 60, when the damping transistor 63 is in an off state. The inclusion of $D_{DAMP}$ may prevent power efficiency loss in the AC power signal when the damping circuit is not active or "on." Indeed, while the damping transistor 63 is designed such that, in an ideal scenario, it serves to effectively short the damping circuit when in an "off" state, in practical terms, some current may still reach the damping circuit and/or some current may possibly flow in the opposite direction out of the damping circuit 60. Thus, inclusion of $D_{DAMP}$ may prevent such scenarios and only allow current, power, and/or voltage to be dissipated towards the damping transistor 63. This configuration, including $D_{DAMP}$, may be desirable when the damping circuit 60 is connected at the drain node of the amplifier transistor 48, as the signal may be a half-wave sine wave voltage and, thus, the voltage of $V_{AC}$ is always positive.

Beyond the damping circuit 60, the amplifier 42, in some examples, may include a shunt capacitor $C_{SHUNT}$. $C_{SHUNT}$ may be configured to shunt the AC power signal to ground and charge voltage of the AC power signal. Thus, $C_{SHUNT}$ may be configured to maintain an efficient and stable waveform for the AC power signal, such that a duty cycle of about 50% is maintained and/or such that the shape of the AC power signal is substantially sinusoidal at positive voltages.

In some examples, the amplifier 42 may include a filter circuit 65. The filter circuit 65 may be designed to mitigate and/or filter out electromagnetic interference (EMI) within the wireless transmission system 20. Design of the filter circuit 65 may be performed in view of impedance transfer and/or effects on the impedance transfer of the wireless power transmission 20 due to alterations in tuning made by the transmission tuning system 24. To that end, the filter circuit 65 may be or include one or more of a low pass filter, a high pass filter, and/or a band pass filter, among other filter circuits that are configured for, at least, mitigating EMI in a wireless power transmission system.

As illustrated, the filter circuit 65 may include a filter inductor $L_o$ and a filter capacitor $C_o$. The filter circuit 65 may have a complex impedance and, thus, a resistance through the filter circuit 65 may be defined as Ro. In some such examples, the filter circuit 65 may be designed and/or configured for optimization based on, at least, a filter quality factor $\gamma_{FILTER}$, defined as:

$$\gamma_{FILTER} = \frac{1}{R_o}\sqrt{\frac{L_o}{C_o}}.$$

In a filter circuit 65 wherein it includes or is embodied by a low pass filter, the cut-off frequency ($\omega_o$) of the low pass filter is defined as:

$$\omega_o = \frac{1}{\sqrt{L_o C_o}}.$$

In some wireless power transmission systems 20, it is desired that the cutoff frequency be about 1.03-1.4 times greater than the operating frequency of the antenna. Experimental results have determined that, in general, a larger $\gamma_{FILTER}$ may be preferred, because the larger $\gamma_{FILTER}$ can improve voltage gain and improve system voltage ripple and timing. Thus, the above values for $L_o$ and $C_o$ may be set such that $\gamma_{FILTER}$ can be optimized to its highest, ideal level (e.g., when the system 10 impedance is conjugately matched for maximum power transfer), given cutoff frequency restraints and available components for the values of $L_o$ and $C_o$.

As illustrated in FIG. 7, the conditioned signal(s) from the amplifier 42 is then received by the transmission tuning system 24, prior to transmission by the antenna 21. The transmission tuning system 24 may include tuning and/or impedance matching, filters (e.g., a low pass filter, a high pass filter, a "pi" or "Π" filter, a "T" filter, an "L" filter, a "LL" filter, and/or an L-C trap filter, among other filters), network matching, sensing, and/or conditioning elements configured to optimize wireless transfer of signals from the wireless transmission system 20 to the wireless receiver system 30. Further, the transmission tuning system 24 may include an impedance matching circuit, which is designed to match impedance with a corresponding wireless receiver system 30 for given power, current, and/or voltage requirements for wireless transmission of one or more of electrical energy, electrical power, electromagnetic energy, and electronic data. The illustrated transmission tuning system 24 includes, at least, $C_{Z1}$, $C_{Z2}$, and (operatively associated with the antenna 21) values, all of which may be configured for impedance matching in one or both of the wireless transmission system 20 and the broader system 10. It is noted that $C_{Tx}$ refers to the intrinsic capacitance of the antenna 21.

Figure 9:
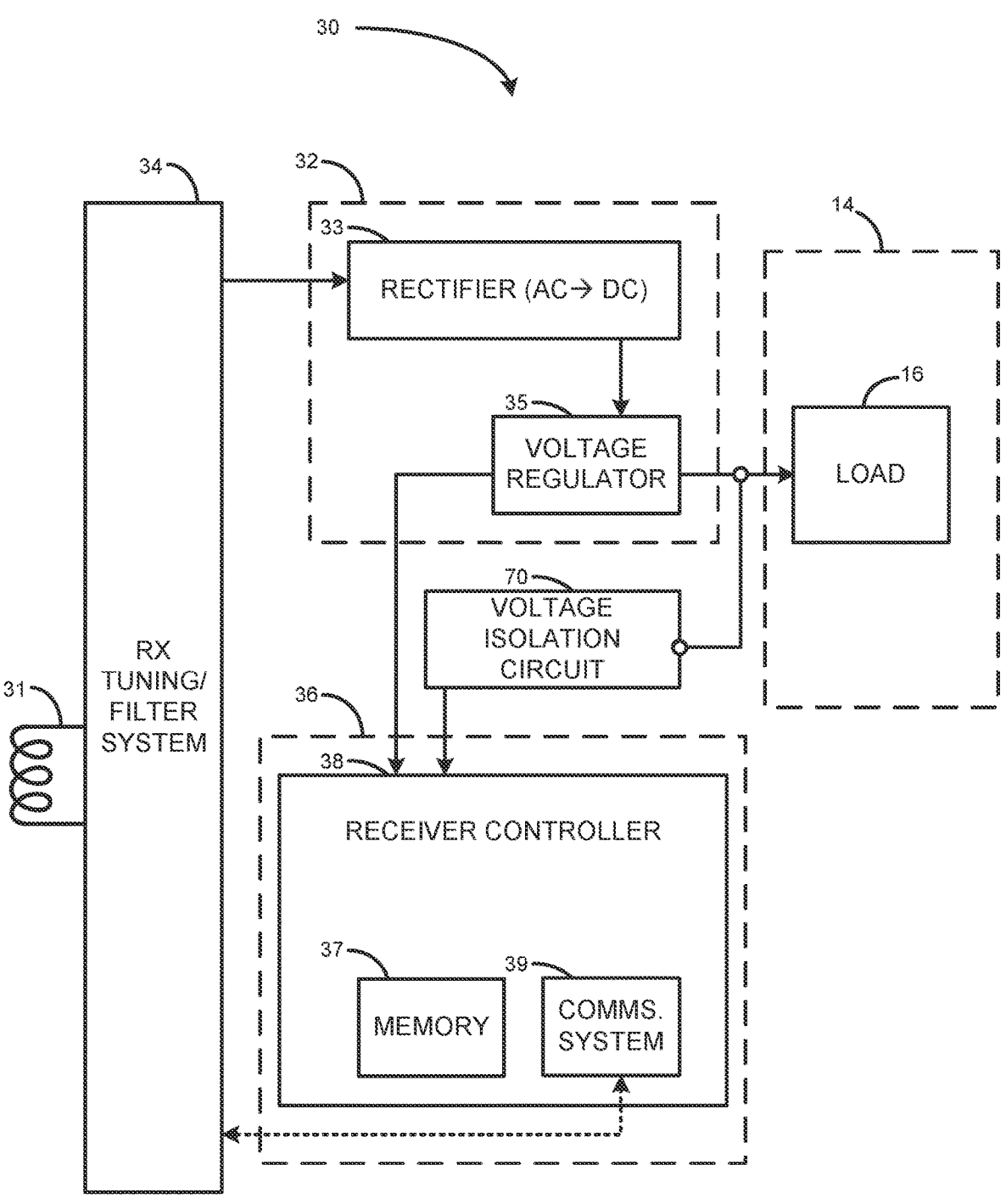
FIG. 9 is a block diagram illustrating components of a receiver control system and a receiver power conditioning system of the wireless receiver system of FIG. 2, in accordance with FIG. 1, FIG. 2, and the present disclosure.

Turning now to FIG. 9 and with continued reference to, at least, FIGS. 1 and 2, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmission antenna 21. As illustrated in FIG. 9, the wireless receiver system 30 includes, at least, the receiver antenna 31, a receiver tuning and filtering system 34, a power conditioning system 32, a receiver control system 36, and a voltage isolation circuit 70. The receiver tuning and filtering system 34 may be configured to substantially match the electrical impedance of the wireless transmission system 20. In some examples, the receiver tuning and filtering system 34 may be configured to dynamically adjust and substantially match the electrical impedance of the receiver antenna 31 to a characteristic impedance of the power generator or the load at a driving frequency of the transmission antenna 20.

As illustrated, the power conditioning system 32 includes a rectifier 33 and a voltage regulator 35. In some examples, the rectifier 33 is in electrical connection with the receiver tuning and filtering system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a voltage doubler, a synchronous voltage rectifier, a controlled rectifier, an uncontrolled rectifier, and a half controlled rectifier. As electronic devices may be sensitive to voltage, additional protection of the electronic device may be provided by clipper circuits or devices. In this respect, the rectifier 33 may further include a clipper circuit or a clipper device, which is a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35 include, but are not limited to, including a series linear voltage regulator, a buck convertor, a low dropout (LDO) regulator, a shunt linear voltage regulator, a step-up switching voltage regulator, a step-down switching voltage regulator, an invertor voltage regulator, a Zener controlled transistor series voltage regulator, a charge pump regulator, and an emitter follower voltage regulator. The voltage regulator 35 may further include a voltage multiplier, which is as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may an LDO linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 (e.g., when the load 16 is a battery and/or other power source) and/or other components of the electronic device 14.

The receiver control system 36 may include, but is not limited to including, a receiver controller 38, a communications system 39 and a memory 37. The receiver controller 38 may be any electronic controller or computing system that includes, at least, a processor which performs operations, executes control algorithms, stores data, retrieves data, gathers data, controls and/or provides communication with other components and/or subsystems associated with the wireless receiver system 30. The receiver controller 38 may be a single controller or may include more than one controller disposed to control various functions and/or features of the wireless receiver system 30. Functionality of the receiver controller 38 may be implemented in hardware and/or software and may rely on one or more data maps relating to the operation of the wireless receiver system 30. To that end, the receiver controller 38 may be operatively associated with the memory 37. The memory may include one or both of internal memory, external memory, and/or remote memory (e.g., a database and/or server operatively connected to the receiver controller 38 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory computer readable memory media.

Further, while particular elements of the receiver control system 36 are illustrated as subcomponents and/or circuits (e.g., the memory 37, the communications system 39, among other contemplated elements) of the receiver control system 36, such components may be external of the receiver controller 38. In some examples, the receiver controller 38 may be and/or include one or more integrated circuits configured to include functional elements of one or both of the receiver controller 38 and the wireless receiver system 30, generally. As used herein, the term "integrated circuits" generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the receiver controller 38 may be a dedicated circuit configured to send and receive data at a given operating frequency. For example, the receiver controller 38 may be a tagging or identifier integrated circuit, such as, but not limited to, an NFC tag and/or labelling integrated circuit. Examples of such NFC tags and/or labelling integrated circuits include the NTAG® family of integrated circuits manufactured by NXP Semiconductors N.V. However, the communications system 39 is certainly not limited to these example components and, in some examples, the communications system 39 may be implemented with another integrated circuit (e.g., integrated with the receiver controller 38), and/or may be another transceiver of or operatively associated with one or both of the electronic device 14 and the wireless receiver system 30, among other contemplated communication systems and/or apparatus. Further, in some examples, functions of the communications system 39 may be integrated with the receiver controller 38, such that the controller modifies the inductive field between the antennas 21, 31 to communicate in the frequency band of wireless power transfer operating frequency.

Figure 10:
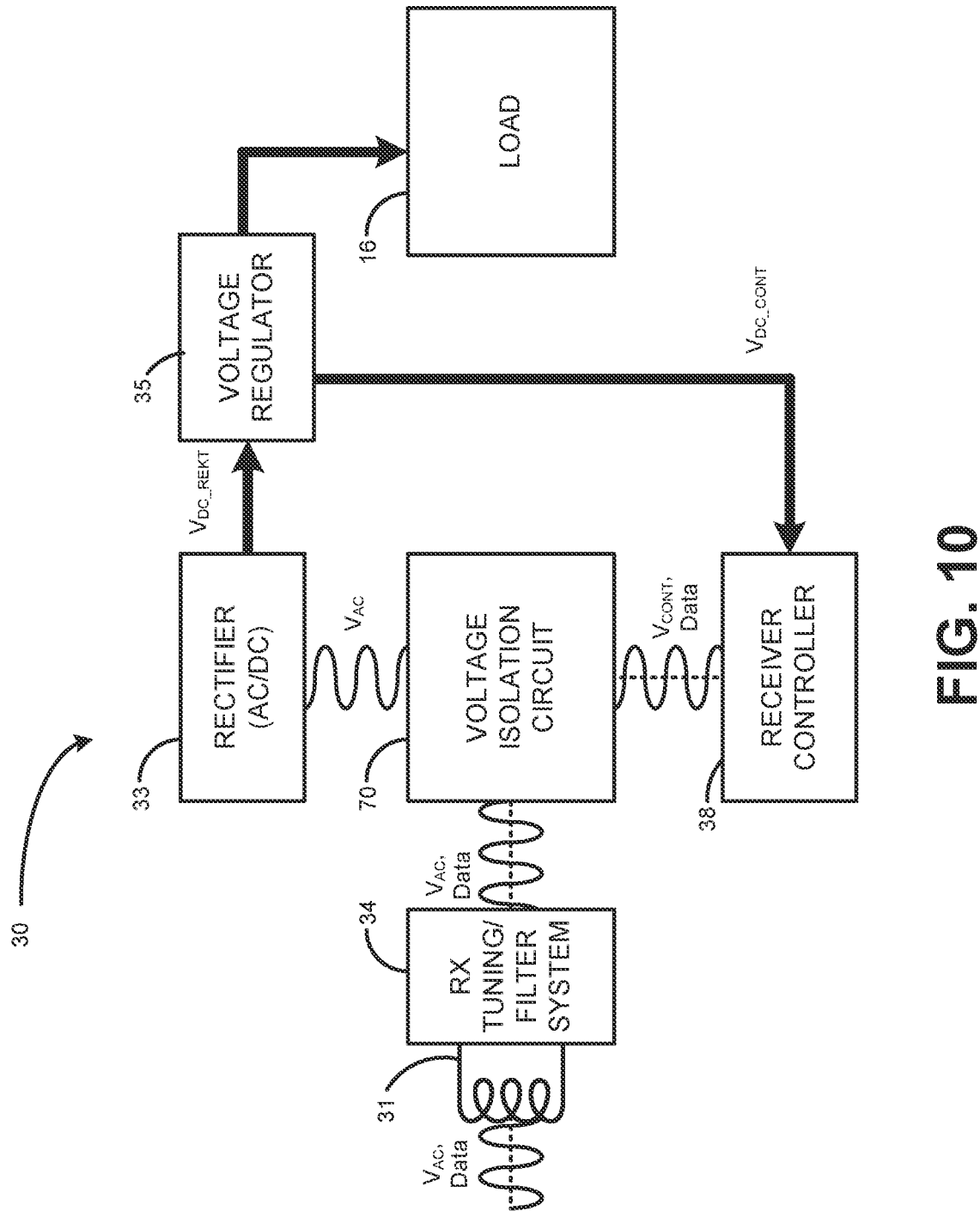
FIG. 10 is a block diagram of elements of the wireless receiver system of FIGS. 1-2 and 9, further illustrating components of an amplifier of the power conditioning system of FIG. 9 and signal characteristics for wireless power transmission, in accordance with FIGS. 1-2, 9, and the present disclosure.
Figure 11:
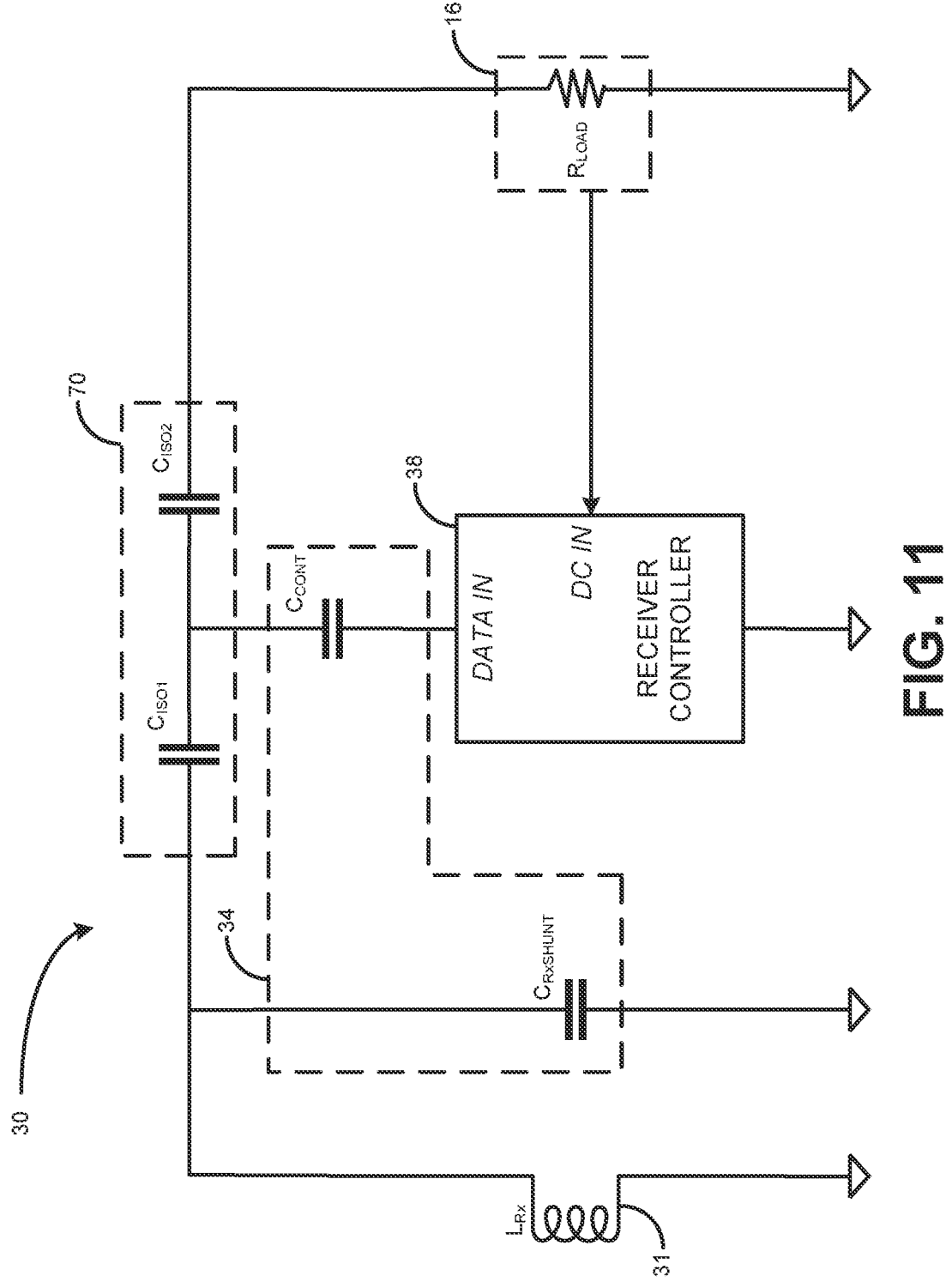
FIG. 11 is an electrical schematic diagram of elements of the wireless receiver system of FIGS. 1-2 and 9-10, further illustrating components of an amplifier of the power conditioning system of FIGS. 9-10, in accordance with FIGS. 1-2, 9-10 and the present disclosure.

Turning now to FIGS. 10 and 11, the wireless receiver system 30 is illustrated in further detail to show some example functionality of one or more of the receiver controller 38, the voltage isolation circuit 70, and the rectifier 33. The block diagram of the wireless receiver system 30 illustrates one or more electrical signals and the conditioning of such signals, altering of such signals, transforming of such signals, rectifying of such signals, amplification of such signals, and combinations thereof. Similarly to FIG. 6, DC power signals are illustrated with heavily bolded lines, such that the lines are significantly thicker than other solid lines in FIG. 6 and other figures of the instant application, AC signals are illustrated as substantially sinusoidal wave forms with a thickness significantly less bolded than that of the DC power signal bolding, and data signals are represented as dotted lines. FIG. 11 illustrates sample electrical components for elements of the wireless transmission system, and subcomponents thereof, in a simplified form. Note that FIG. 11 may represent one branch or subsection of a schematic for the wireless receiver system 30 and/or components of the wireless receiver system 30 may be omitted from the schematic, illustrated in FIG. 11, for clarity.

As illustrated in FIG. 10, the receiver antenna 31 receives the AC wireless signal, which includes the AC power signal ($V_{AC}$) and the data signals (denoted as "Data" in FIG. 10), from the transmitter antenna 21 of the wireless transmission system 20. (It should be understood an example of a transmitted AC power signal and data signal was previously shown in FIG. 6). $V_{AC}$ will be received at the rectifier 33 and/or the broader receiver power conditioning system 32, wherein the AC wireless power signal is converted to a DC wireless power signal ($V_{DC\_REKT}$). $V_{DC\_REKT}$ is then provided to, at least, the load 16 that is operatively associated with the wireless receiver system 30. In some examples, $V_{DC\_REKT}$ is regulated by the voltage regulator 35 and provided as a DC input voltage ($V_{DC\_CONT}$) for the receiver controller 38. In some examples, such as the signal path shown in FIG. 11, the receiver controller 38 may be directly powered by the load 16. In some other examples, the receiver controller 38 need not be powered by the load 16 and/or receipt of $V_{DC\_CONT}$, but the receiver controller 38 may harness, capture, and/or store power from $V_{AC}$, as power receipt occurring in receiving, decoding, and/or otherwise detecting the data signals in-band of $V_{AC}$.

The receiver controller 38 is configured to perform one or more of encoding the wireless data signals, decoding the wireless data signals, receiving the wireless data signals, transmitting the wireless data signals, and/or any combinations thereof. In examples, wherein the data signals are encoded and/or decoded as amplitude shift keyed (ASK) signals and/or OOK signals, the receiver controller 38 may receive and/or otherwise detect or monitor voltage levels of $V_{AC}$ to detect in-band ASK and/or OOK signals. However, at higher power levels than those currently utilized in standard high frequency, NFMC communications and/or low power wireless power transmission, large voltages and/or large voltage swings at the input of a controller, such as the controller 38, may be too large for legacy microprocessor controllers to handle without disfunction or damage being done to such microcontrollers. Additionally, certain microcontrollers may only be operable at certain operating voltage ranges and, thus, when high frequency wireless power transfer occurs, the voltage swings at the input to such microcontrollers may be out of range or too wide of a range for consistent operation of the microcontroller.

For example, in some high frequency higher power wireless power transfer systems 10, when an output power from the wireless power transmitter 20 is greater than 1 W, voltage across the controller 38 may be higher than desired for the controller 38. Higher voltage, lower current configurations are often desirable, as such configurations may generate lower thermal losses and/or lower generated heat in the system 10, in comparison to a high current, low voltage transmission. To that end, the load 16 may not be a consistent load, meaning that the resistance and/or impedance at the load 16 may swing drastically during, before, and/or after an instance of wireless power transfer.

This is particularly an issue when the load 16 is a battery or other power storing device, as a fully charged battery has a much higher resistance than a fully depleted battery. For the purposes of this illustrative discussion, we will assume:

$$V_{AC\_MIN}=I_{AC\_MIN}*R_{LOAD\_MIN}, \text{ and}$$

$$P_{AC\_MIN}=I_{AC}*V_{LOAD\_MIN}=(I_{AC\_MIN})^2*R_{LOAD\_MIN}$$

wherein $R_{LOAD\_MIN}$ is the minimum resistance of the load 16 (e.g., if the load 16 is or includes a battery, when the battery of the load 16 is depleted), $I_{AC\_MIN}$ is the current at $R_{LOAD\_MIN}$, $V_{AC\_MIN}$ is the voltage of $V_{AC}$ when the load 16 is at its minimum resistance and $P_{AC\_MIN}$ is the optimal power level for the load 16 at its minimal resistance. Further, we will assume:

$$V_{AC\_MAX}=I_{AC\_MAX}*R_{LOAD\_MAX}, \text{ and}$$

$$P_{AC\_MAX}=I_{AC\_MAX}*V_{LOAD\_MAX}=(I_{AC\_MAX})^2* \\ R_{LOAD\_MAX}$$

wherein $R_{LOAD\_MAX}$ is the maximum resistance of the load 16 (e.g., if the load 16 is or includes a battery, when the battery of the load 16 is depleted), $I_{AC\_MAX}$ is the current at $V_{AC\_MAX}$, $V_{AC\_MAX}$ is the voltage of $V_{AC}$ when the load 16 is at its minimum resistance and $P_{AC\_MAX}$ is the optimal power level for the load 16 at its maximal resistance.

Accordingly, as the current is desired to stay relatively low, the inverse relationship between $I_{AC}$ and $V_{AC}$ dictate that the voltage range must naturally shift, in higher ranges, with the change of resistance at the load 16. However, such voltage shifts may be unacceptable for proper function of the controller 38. To mitigate these issues, the voltage isolation circuit 70 is included to isolate the range of voltages that can be seen at a data input and/or output of the controller 38 to an isolated controller voltage ($V_{CONT}$), which is a scaled version of $V_{AC}$ and, thus, comparably scales any voltage-based in-band data input and/or output at the controller 38.

Accordingly, if a range for the AC wireless signal that is an unacceptable input range for the controller 38 is represented by $$V_{AC}=[V_{AC\_MIN}{:}V_{AC\_MAX}]$$

then the voltage isolation circuit 70 is configured to isolate the controller-unacceptable voltage range from the controller 38, by setting an impedance transformation to minimize the voltage swing and provide the controller with a scaled version of $V_{AC}$, which does not substantially alter the data signal at receipt. Such a scaled controller voltage, based on $V_{AC}$, is $V_{CONT}$, where $$V_{CONT}=[V_{CONT\_MIN}{:}V_{CONT\_MAX}].$$

While an altering load is one possible reason that an unacceptable voltage swing may occur at a data input of a controller, there may be other physical, electrical, and/or mechanical characteristics and/or phenomena that may affect voltage swings in $V_{AC}$, such as, but not limited to, changes in coupling (k) between the antennas 21, 31, detuning of the system(s) 10, 20, 30 due to foreign objects, proximity of another receiver system 30 within a common field area, among other things.

As best illustrated in FIG. 11, the voltage isolation circuit 70 includes at least two capacitors, a first isolation capacitor $C_{ISO1}$ and a second isolation capacitor $C_{ISO2}$. While only two series, split capacitors are illustrated in FIG. 11, it should also be understood that the voltage isolation circuit may include additional pairs of split series capacitors. $C_{ISO1}$ and $C_{ISO2}$ are electrically in series with one another, with a node therebetween, the node providing a connection to the data input of the receiver controller 38. $C_{ISO1}$ and $C_{ISO2}$ are configured to regulate $V_{AC}$ to generate the acceptable voltage input range $V_{CONT}$ for input to the controller. Thus, the voltage isolation circuit 70 is configured to isolate the controller 38 from $V_{AC}$, which is a load voltage, if one considers the rectifier 33 to be part of a downstream load from the receiver controller 38.

In some examples, the capacitance values are configured such that a parallel combination of all capacitors of the voltage isolation circuit 70 (e.g., $C_{ISO1}$ and $C_{ISO2}$) is equal to a total capacitance for the voltage isolation circuit ($C_{TOTAL}$). Thus, $$C_{ISO1}\|C_{ISO2}=C_{TOTAL},$$

wherein $C_{TOTAL}$ is a constant capacitance configured for the acceptable voltage input range for input to the controller. $C_{TOTAL}$ can be determined by experimentation and/or can be configured via mathematical derivation for a particular microcontroller embodying the receiver controller 38.

In some examples, with a constant $C_{TOTAL}$, individual values for the isolation capacitors $C_{ISO1}$ and $C_{ISO2}$ may be configured in accordance with the following relationships:

$$C_{ISO1} = \frac{C_{TOTAL}*(1+t_v)}{t_v}, \text{ and}$$

$$C_{ISO2} = C_{TOTAL}*(1+t_v).$$

wherein $t_v$ is a scaling factor, which can be experimentally altered to determine the best scaling values for $C_{ISO1}$ and $C_{ISO2}$, for a given system. Alternatively, $t_v$ may be mathematically derived, based on desired electrical conditions for the system. In some examples (which may be derived from experimental results), $t_v$ may be in a range of about 3 to about 10.

FIG. 11 further illustrates an example for the receiver tuning and filtering system 34, which may be configured for utilization in conjunction with the voltage isolation circuit 70. The receiver tuning and filtering system 34 of FIG. 11 includes a controller capacitor $C_{CONT}$, which is connected in series with the data input of the receiver controller 38. The controller capacitor is configured for further scaling of $V_{AC}$ at the controller, as altered by the voltage isolation circuit 70. To that end, the first and second isolation capacitors, as shown, may be connected in electrical parallel, with respect to the controller capacitor.

Additionally, in some examples, the receiver tuning and filtering system 34 includes a receiver shunt capacitor $C_{RxSHUNT}$, which is connected in electrical parallel with the receiver antenna 31. $C_{RxSHUNT}$ is utilized for initial tuning of the impedance of the wireless receiver system 30 and/or the broader system 30 for proper impedance matching and/or $C_{RxSHUNT}$ is included to increase the voltage gain of a signal received by the receiver antenna 31.

The wireless receiver system 30, utilizing the voltage isolation circuit 70, may have the capability to achieve proper data communications fidelity at greater receipt power levels at the load 16, when compared to other high frequency wireless power transmission systems. To that end, the wireless receiver system 30, with the voltage isolation circuit 70, is capable of receiving power from the wireless transmission system that has an output power at levels over 1 W of power, whereas legacy high frequency systems may be limited to receipt from output levels of only less than 1 W of power. For example, in legacy NFC-DC systems, the poller (receiver system) often utilizes a microprocessor from the NTAG family of microprocessors, which was initially designed for very low power data communications. NTAG microprocessors, without protection or isolation, may not adequately and/or efficiently receive wireless power signals at output levels over 1 W. However, inventors of the present application have found, in experimental results, that when utilizing voltage isolation circuits as disclosed herein, the NTAG chip may be utilized and/or retrofitted for wireless power transfer and wireless communications, either independently or simultaneously.

To that end, the voltage isolation circuits disclosed herein may utilize inexpensive components (e.g., isolation capacitors) to modify functionality of legacy, inexpensive microprocessors (e.g., an NTAG family microprocessor), for new uses and/or improved functionality. Further, while alternative controllers may be used as the receiver controller 38 that may be more capable of receipt at higher voltage levels and/or voltage swings, such controllers may be cost prohibitive, in comparison to legacy controllers. Accordingly, the systems and methods herein allow for use of less costly components, for high power high frequency wireless power transfer.

Figure 12:
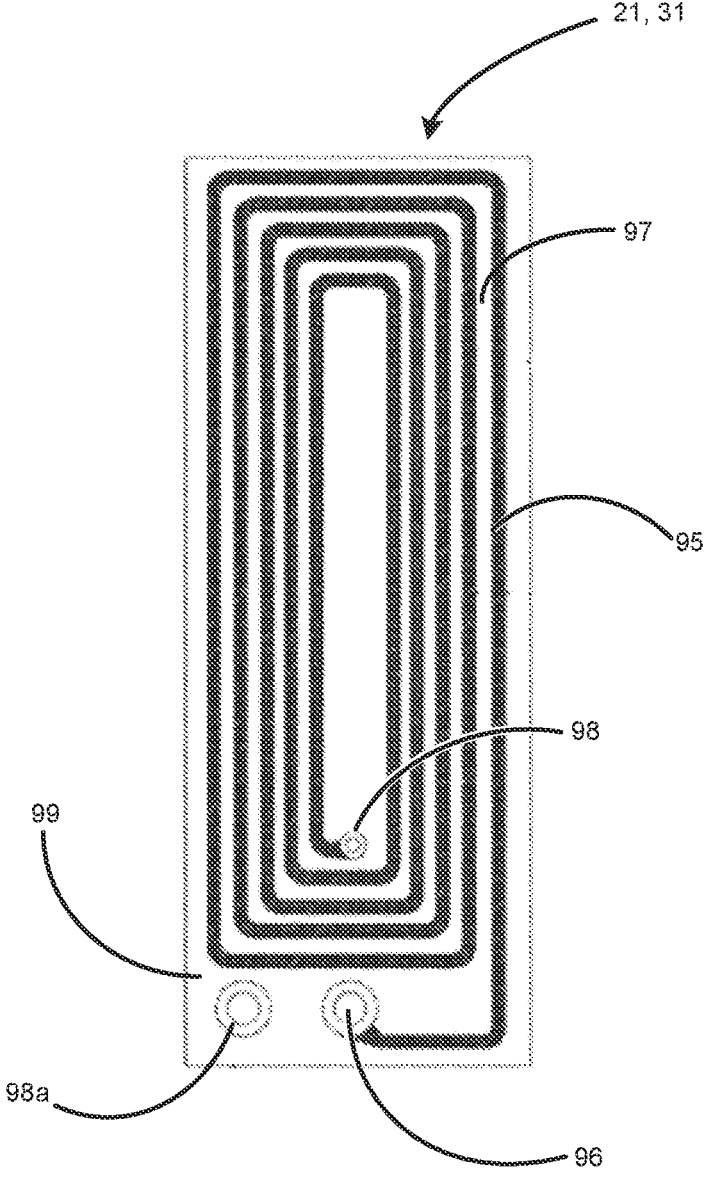
FIG. 12 is a top view of a non-limiting, exemplary antenna, for use as one or both of a transmission antenna and a receiver antenna of the system of FIGS. 1-7, 9-11 and/or any other systems, methods, or apparatus disclosed herein, in accordance with the present disclosure.

FIG. 12 illustrates an example, non-limiting embodiment of one or more of the transmission antenna 21 and the receiver antenna 31 that may be used with any of the systems, methods, and/or apparatus disclosed herein. In the illustrated embodiment, the antenna 21, 31, is a flat spiral coil configuration. Non-limiting examples can be found in U.S. Pat. Nos. 9,941,743, 9,960,628, 9,941,743 all to Peralta et al.; 9,948,129, 10,063,100 to Singh et al.; U.S. Pat. No. 9,941,590 to Luzinski; U.S. Pat. No. 9,960,629 to Rajagopalan et al.; and U.S. Patent App. Nos. 2017/0040107, 2017/0040105, 2017/0040688 to Peralta et al.; all of which are assigned to the assignee of the present application and incorporated fully herein by reference.

In addition, the antenna 21, 31 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, and 9,300,046 to Singh et al., all of which are assigned to the assignee of the present application are incorporated fully herein. These are merely exemplary antenna examples; however, it is contemplated that the antennas 21, 31 may be any antenna capable of the aforementioned higher power, high frequency wireless power transfer.

Figure 13:
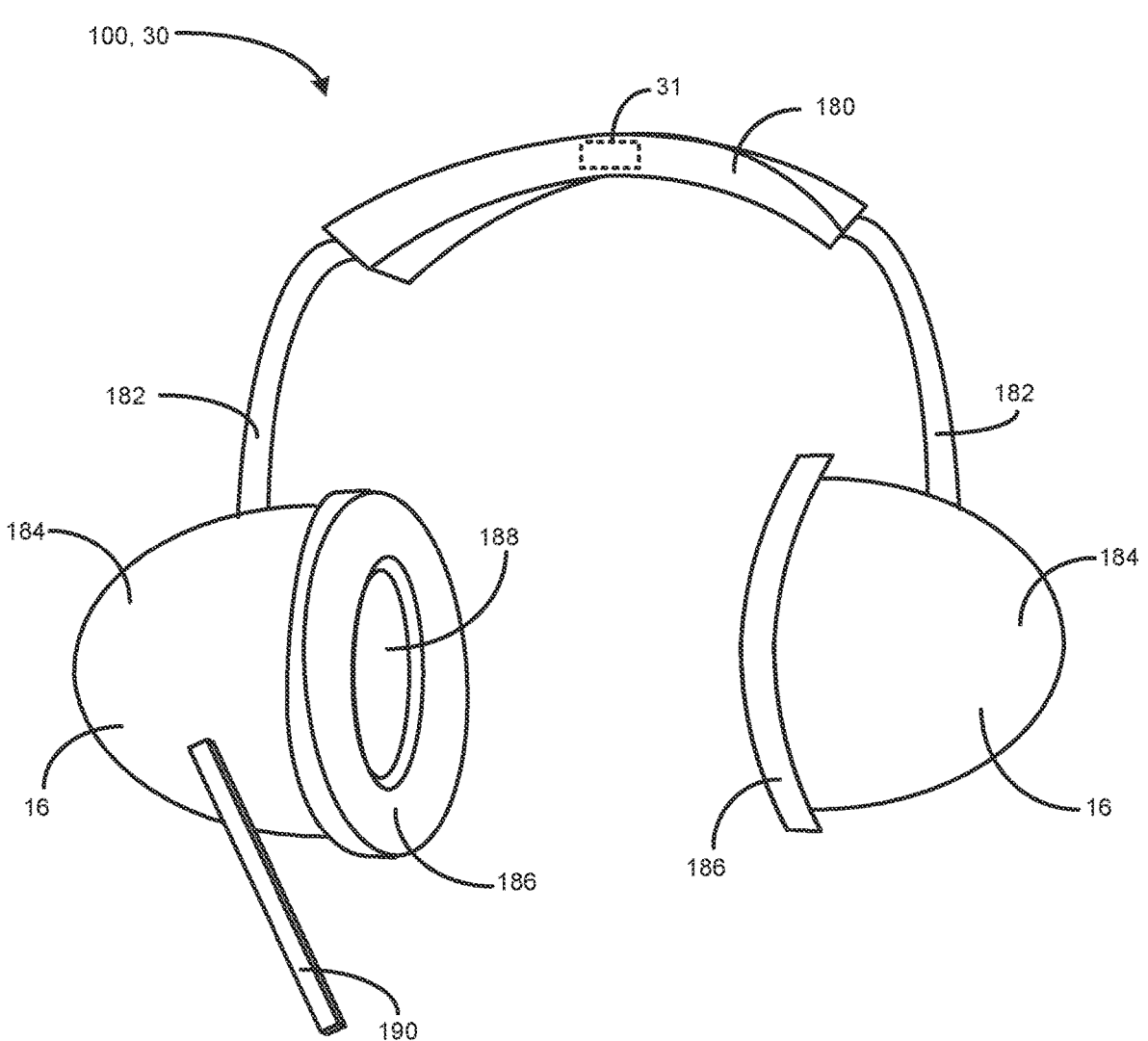
FIG. 13 is a perspective view of a wearable communication device, within which a portion of the wireless power transfer systems disclosed herein may be implemented in accordance with FIGS. 1-7, 9-12, and the present disclosure.

FIG. 13 is a perspective view of a wearable communication device 100, which may be operatively associated with the wireless receiver system 30, for the purposes of receiving power wirelessly from the wireless transmission system 20 (not pictured). The wearable communication device 100 comprises a wireless headset including a headband 180, adjustment bars 182 for fitting the headset to a user's head, and at least one earcup 184. Each earcup 184 includes an acoustic device (not shown) to produce sound to be delivered to a user's ear(s). It is contemplated that any type of suitable electroacoustic transducer may be employed for the acoustic device as known by one with skill in the art. Each earcup 184 may include a toroidal shaped cushion 186, which defines an opening 188 permitting the sound produced by the acoustic device (i.e., speaker) to pass through the cushion 186. The wireless communication device may include a microphone boom 190 as depicted or any number of microphones and associated openings may be embedded in the earcups 184. The microphone boom 190 may be permanently affixed, adjustable, and/or removable. One having ordinary skill in the art would understand elements and/or details of a wireless headset that have been omitted for simplicity. For example, an on/off switch, volume controls, controls for activating/deactivating features such as: active noise cancelling (ANC), varied signal processing for different listening experiences and the like are contemplated and not shown.

Still referring to FIG. 13, the wearable communication device 100 includes the wireless receiver system 30, in accordance with the present disclosure. To that end, a receiver antenna 31 may be positioned proximate to, or within the headband 180. The remaining elements of the wireless receiver system 30, may be positioned proximate to, or within an earcup 184, proximate to, within other volumes of the headband 180, and/or divided up between a pair of earcups 184 and/or the headband 180. It is contemplated that in one embodiment the receiver antenna 31 may include a coil having extended ends 31a that connect the receiver antenna 31 to the wireless receiver system 30 positioned proximate to, or within an earcup 184. It is also contemplated that in an alternative embodiment the wireless receiver system 30 maybe positioned proximate to, or within the headband 180. In one alternative embodiment the wireless receiver system 30 is positioned spaced apart from the receiver antenna 31, which includes a coil having extended ends 31b that connect to the wireless receiver system 30. In a further alternative embodiment, the wireless receiver system 30 may be positioned adjacent to the receiver antenna 31 (not shown). In yet a further alternative embodiment, the wireless receiver system 30 may include a printed circuit board (not shown) and the receiver antenna 31 is a component mounted on the printed circuit board and connected to the wireless receiver system (not shown).

The load 16 (e.g., when the load 16 is a battery and/or other power source) of the wearable communication device 100 may be positioned within an earcup 184 or within any portion of the wearable communication device 100 for providing electrical power to the electronic elements of the wearable communication device 100.

As used herein, a "wearable communication device" may include any portable device that may be worn and designed to output sound that can be heard by a user and, optionally, capture the voice of the user for transmission. Such wearable communication devices include, but are not limited to, headphones, earbuds, canalphones, over ear headphones, ear-fitting headphones, headsets, digital conferencing headsets, and smart watches/wearables, among other communication devices. Headphones are one type of wearable communication device, while portable speakers are another.

The term "headphones" and/or "headset" represents a portable wearable communication device that is designed to be worn on or around a user's head. Such devices convert an electrical signal to a corresponding sound that can be heard by the user of the device and may include a variety of microphones for communicating. Headphones include traditional headphones that are worn over a user's head and include left and right listening devices connected to each other by a head band, headsets, and earbuds. Depending on the size of the earcups 184, relative to the typical size of the human ear, each of the earcups 184 may be either an "on-ear" (also commonly called "supra-aural") or an "around-ear" (also commonly called "circum-aural") form of earcup. However, despite the depiction in FIG. 13 of this particular physical configuration of the wearable communication device 100, those skilled in the art will readily recognize that the head assembly may take any of a variety of other physical configurations.

The wireless receiver system 30 may be integrated with the wearable communication device 100 and may be utilized to charge a battery or other storage device of or associated with the wearable communication device 100. Additionally or alternatively, the wireless receiver system 30 may be used to directly power one or more components of/or associated with the wearable communication device 100.

Figure 14:
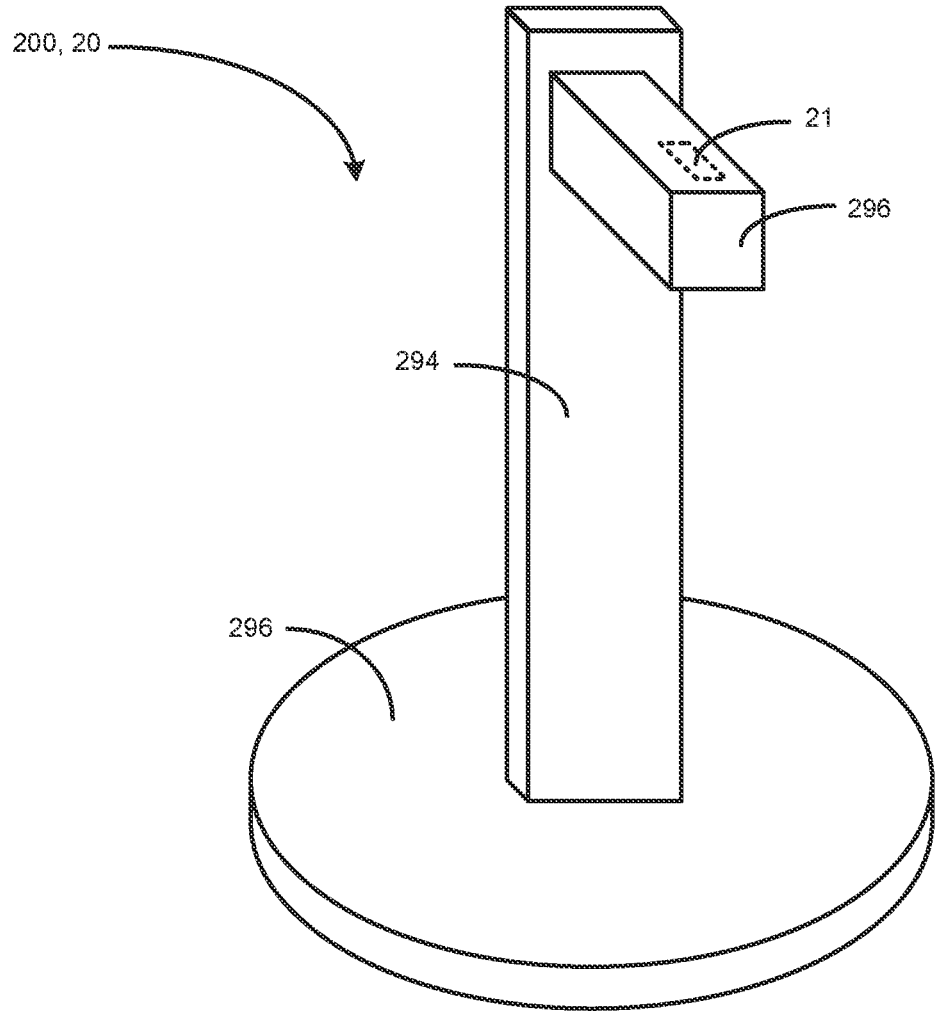
FIG. 14 is a perspective view of a charging base, within which a portion of the wireless power transfer systems disclosed herein may be implemented in accordance with FIGS. 1-7, 9-13, and the present disclosure.

FIG. 14 is a perspective view of a charging base 200, which is configured to support a wearable communication device 100. In particular, the charging base 200 comprises a housing that includes at least a base support 292, a vertical support 294, and a horizontal support 296. In the present configuration it is contemplated that the charging base 200 integrates a wireless transmission system 20, in accordance with the present disclosure. The components of the wireless transmission system may be placed throughout the changing base 200. Specifically, in the present embodiment, a transmission antenna 21 may be positioned with a portion of the horizontal support 296 and the remaining components may be positioned or located adjacent the transmission antenna 21 or anywhere within the housing components of the charging base 200. It is contemplated that the shape and structure of the housing of the charging base 200 may take any shape that is useful for coupling the wireless transmission system 20 with the wireless receiver system 30 in accordance with the present disclosure.

Figure 15:
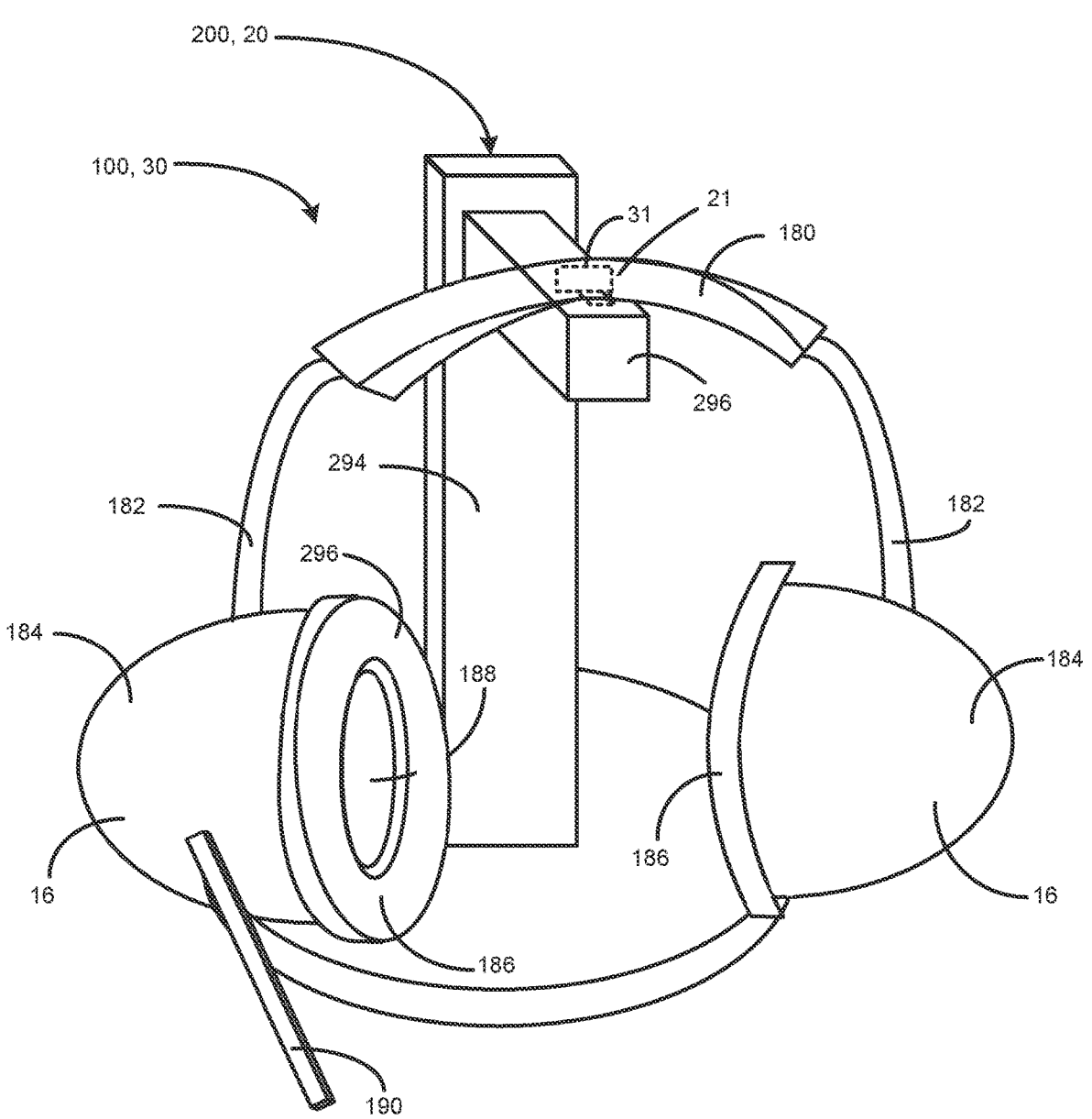
FIG. 15 is a perspective of the wearable communication device of FIG. 13 supported by the charging base of FIG. 14, within which a portion of the wireless power transfer systems disclosed herein may be implemented in accordance with FIGS. 1-7, 9-14, and the present disclosure.

Referring now to FIG. 15, a perspective view of the wearable communication device 100 is depicted in a charging position, when the wearable communication device 100 is positioned on or proximate to the horizontal support 296 of the charging base 200. It is contemplated that the shape and structure of the horizontal support arm 296 may be structurally formed such that the structure of the horizontal support arm 296 advantageously aids the user in positioning the headband 180, such that said positioning aids in aligning the receiver antenna 31 with the transmission antenna 21. Conversely, the headband 180 may also be shaped and/or include structure(s) to facilitate alignment of the receiver antenna 31 with the transmission antenna 21. In particular, the headband may be padded as one of ordinary skill in the art would understand and the padding may include a notch (not shown) or other physical opening and/or alignment characteristic where the receiver antenna 31 is positioned. The notch may be configured to receive a portion of the horizontal support 296 of the changing base 200 to facilitate alignment and coupling of the receiver antenna 31 and transmission antenna 21.

The receiver antenna 31 of the wearable communication device 100 is positioned to exchange power and data with the transmission antenna 21 of charging base 200. The receiver antenna 31 of each wearable communication device 100 is a component of a wireless power receiving system, such as the wireless receiver system 30 of FIG. 1. When the wearable communication device 100 is positioned on the charging base 200, the receiver antenna 31 aligns with the transmission antenna 21 of the charging base 200 at an orientation and distance. In this alignment, the transmission antenna 21 is able to resonantly couple with the receiver antenna 31. In this way, the charging base 200 charges the wearable communication device 100 so that it may be employed by a user for listening and/or communicating repeatedly without having to connect a physical charging cable.

While the positions of the receiver antenna 131 and transmission antenna 21 should be accurately placed to allow resonant coupling when the wearable communication device 100 is positioned on the wireless charging base 200, the form and shape of the wireless charging base is not otherwise restricted.

Figure 16:
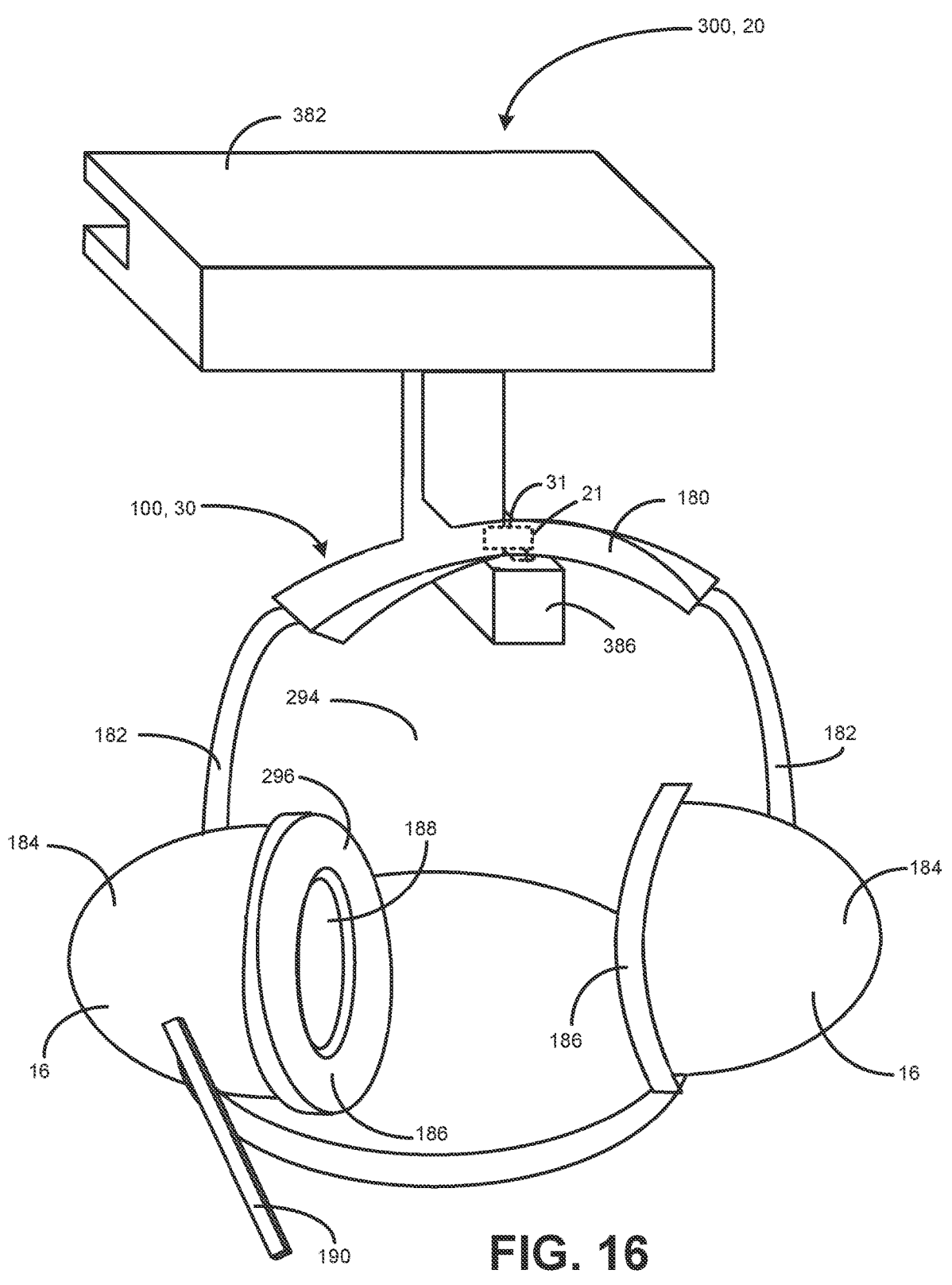
FIG. 16 is a perspective view of another embodiment of the wireless power transfer system of FIG. 15, in accordance with FIGS. 1-7, 9-15, and the present disclosure.

Now turning to FIG. 16, another embodiment of a wireless power transfer system 10 for the wearable communication device 100 including an inverted charging base 300 is depicted in a perspective view. The inverted charging base 300 comprises a base clip 382 configured to attach to a horizontal surface, such as a desk or tabletop. An inverted vertical support 384 extends downwards from the base clip 382. A horizontal support 386 extends from the inverted vertical support 384. The inverted charging base 300 includes a wireless transmission system 20 (not shown), in accordance with the present disclosure and the charging base 200. The wearable communication device 100 is depicted positioned on the horizontal support 386 such that the receiver antenna 31 and the transmission antenna 21 will inductively couple for wireless power and data transmission in accordance with the present disclosure. It is contemplated that numerous configurations of charging bases may be paired with the wearable communication device 100 to maximize space efficiency and/or esthetics as desired by a user. It is also contemplated that the configuration of attachment and/or support mechanism for the charging base is not limited to the embodiments disclosed.

However, it will be appreciated that the use of the charging base 200 or inverted charging base 300 for charging does not foreclose other charging configurations for wearable communication device 100.

Figure 17:
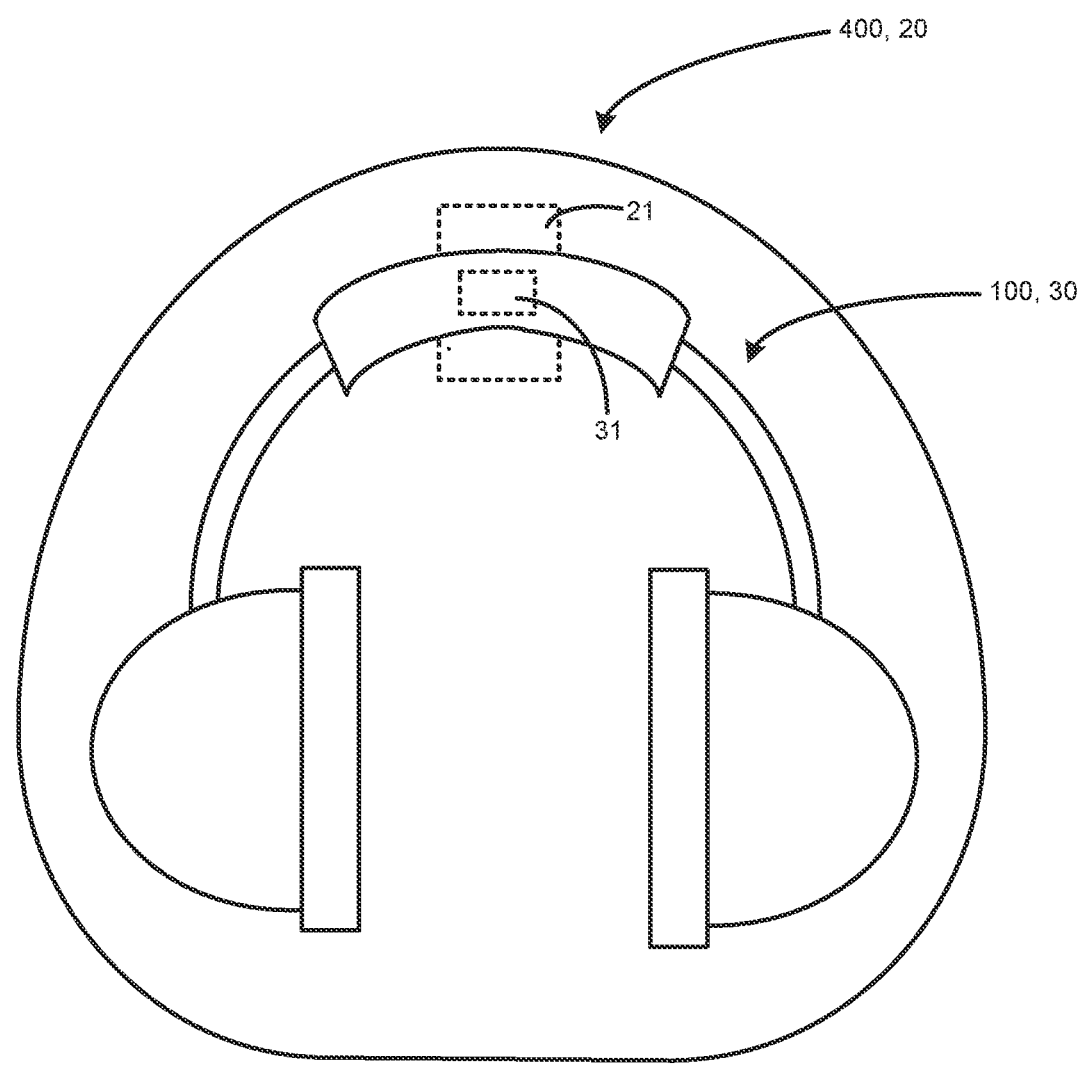
FIG. 17 is a simplified top view of yet another embodiment of the wireless power transfer system of FIG. 15, in accordance with FIGS. 1-7, 9-16, and the present disclosure.

With this in mind, FIG. 17 shows an alternative embodiment of a wireless power transfer system that includes the wearable communication device 100 positioned within a charging case 400. Many users require the ability to charge mobile devices such as a wearable communication device 100 while traveling and not in use. It is contemplated that the charging case may be configured such that the receiver antenna 31 is positioned and aligned with a transmission antenna 21 of a wireless transmission system 20 (not shown) contained within the confines of the case. It is further contemplated that the wearable communication system 100 may be configured such that the attachment and or structure of the adjustment bars 182 and earcups 184 may permit reconfiguring (e.g., folding, rotating) such the charging case 400 may receive the wearable communication system 100 with the smallest footprint possible. It is also contemplated that the charging case 400 may include a battery (not shown) to power the wireless transmission system 20 for charging the wearable communication system 100, even when traveling and an external electrical power source is not available.

Similarly, other aspect of the charging case 400 may be minimized or eliminated without altering its primary functions. For example, the charging case 400, may comprise a housing including a clamping structure in another embodiment (not shown) that merely attaches to the headband 110 of the wearable communication device 100. The clamping housing may contain components of the wireless transmission system 20, in accordance with the present disclosure, and aid in aligning the transmission antenna 21 with the receiver antenna 31, for the transmission of wireless power and data via inductive coupling.

Figure 18A:
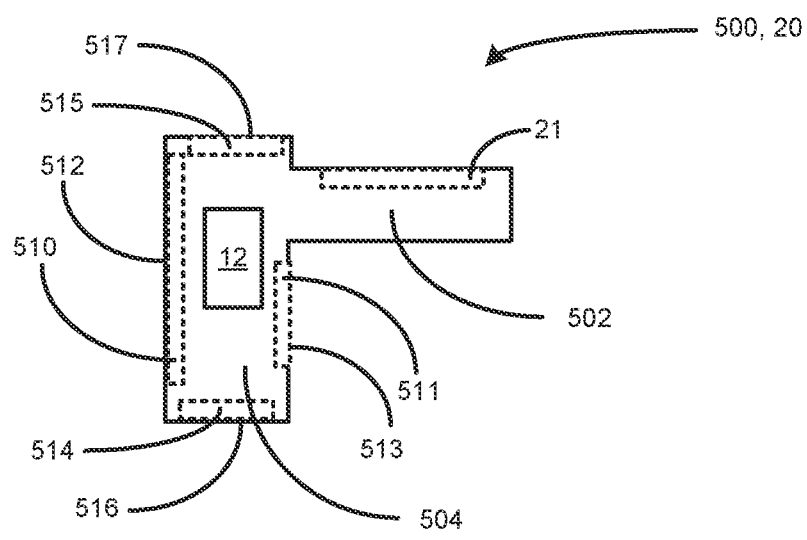
FIG. 18A is a side view of a charging hook, within which a portion of the wireless power transfer systems disclosed herein may be implanted, in accordance with FIGS. 1-7, 9-17, and the present disclosure.
Figure 18B:
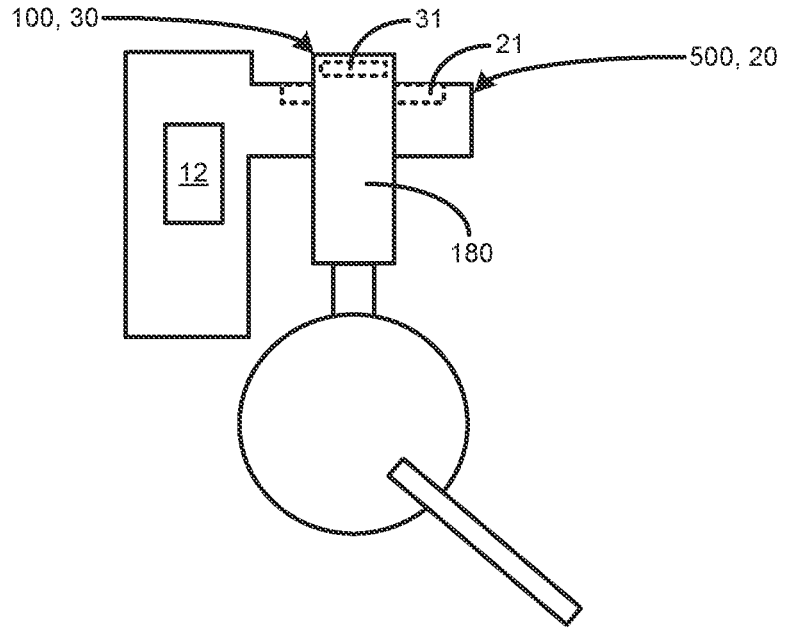
FIG. 18B is a side view of the charging hook of FIG. 18A and the wearable communication device of FIG. 13, within which a portion of the wireless power transfer systems disclosed herein may be implanted, in accordance with FIGS. 1-7, 9-18A, and the present disclosure.

Turning now to FIGS. 18A-B, and with continued reference to the wearable communication device 100 of FIG. 13, a charging hook 500, including the wireless transmission system 20 integrated therein, is illustrated. While described as a "hook," the charging hook 500 need not be of a hooked or curved shape; rather, the charging hook need only be a protrusion suitable for supporting a headband 180 of the wearable communications device 100. As best illustrated in FIG. 18A, the charging hook 500 includes a support arm 502 which protrudes from an attachment structure 504. The support arm is configured to retain the headband 180 of the device 100 and position the receiver antenna 31, of the device 100, to receive the power signal from the transmitting antenna 21. As such, the transmitting antenna 21 is positioned proximate to or within the headband 180.

The attachment structure 504 is configured for affixing the charging hook 50 to a device, particularly a device that may exist on a computer user's desktop. For example, the device, upon which the attachment structure 504 attaches, may be a computer monitor, a display, a personal computer (PC), a set top box, a computer tower, a pre-built PC, a PC chassis, or any combinations thereof. Mechanical mechanisms for attaching the attachment structure 504 so such a device may exist or extend from one of a plurality of surfaces of the attachment portion 504, such as, but not limited to (best illustrated in FIG. 18A) a top attachment surface 517 proximate to a top portion 515 of the attachment structure 504, a back attachment surface 512 proximate to a back portion 512 of the attachment structure 504, a bottom surface 516 proximate to a bottom portion 514 of the attachment structure 504, a forward surface 511 proximate to a forward portion 513, or any combinations thereof.

Figures 19A, 19B:
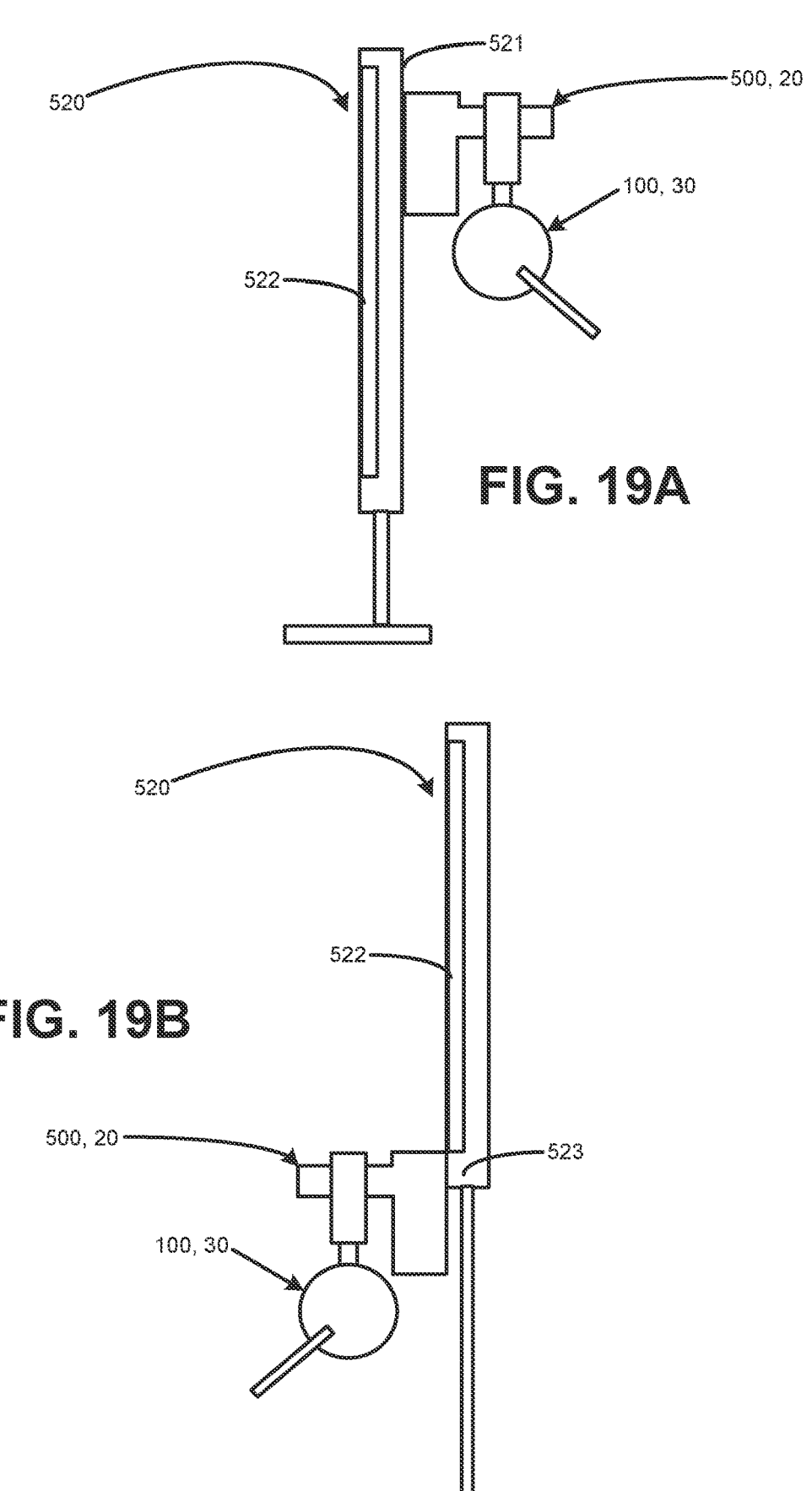
FIG. 19A is a side view of the charging hook of FIG. 18A and the wearable communication device of FIG. 13, within which a portion of the wireless power transfer systems disclosed herein may be implanted, wherein the charging hook is attached to a rear side of a computer monitor, in accordance with FIGS. 1-7, 9-18B, and the present disclosure.
FIG. 19B is a side view of the charging hook of FIG. 18A and the wearable communication device of FIG. 13, within which a portion of the wireless power transfer systems disclosed herein may be implanted, wherein the charging hook is attached to a bottom side of a computer monitor, in accordance with FIGS. 1-7, 9-19A, and the present disclosure.
Figure 19C:
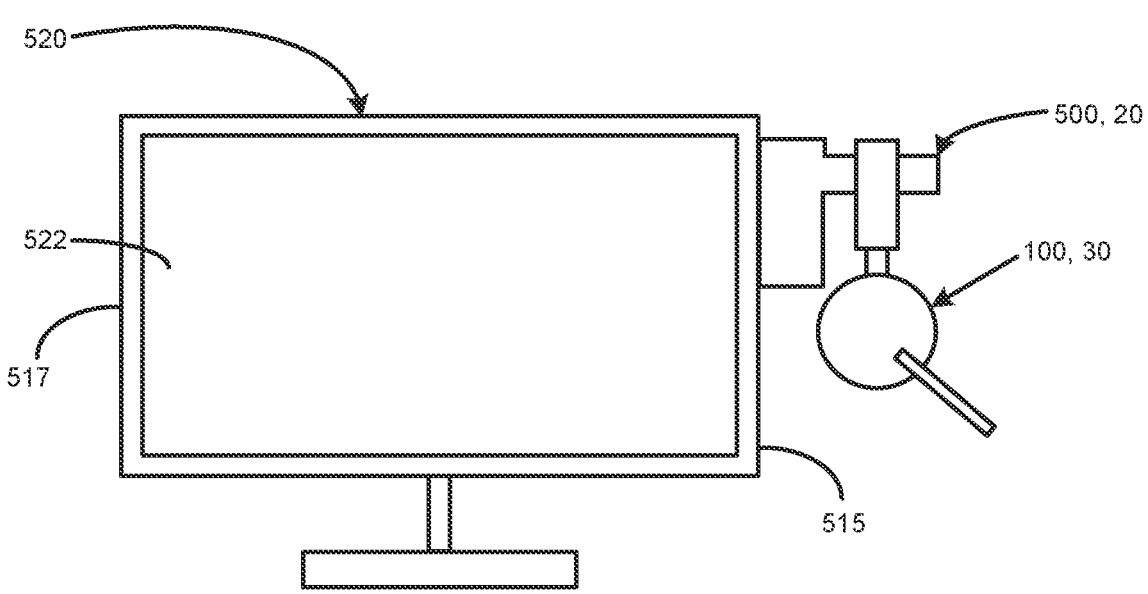
FIG. 19C is a side view of the charging hook of FIG. 18A and the wearable communication device of FIG. 13, within which a portion of the wireless power transfer systems disclosed herein may be implanted, wherein the charging hook is attached to a side of a computer monitor, in accordance with FIGS. 1-7, 9-19B, and the present disclosure.

Turning now to FIGS. 19A-C, a plurality of example configurations for utilizing the charging hook 500 are illustrated, wherein the device, upon which the charging hook 500 attaches, is a computer monitor 520. As illustrated in FIG. 19A, the charging hook 500 may be affixed to a rear side 521 of the computer monitor 521, wherein the rear side 521 may be defined as a side of the monitor 520 that is opposite of a screen 522 of the monitor 520. Additionally or alternatively, as illustrated in FIG. 19B, the charging hook 500 may be mounted to a lower front portion 523 of the monitor 520, wherein the lower front portion 523 may be defined as a non-screen portion of the front of the monitor 520, that exists below the screen 522, such as, but not limited to, a bezel of the monitor 520. Still, additionally or alternatively, as best illustrated in FIG. 19C, the charging hook 500 may be attached to the monitor 520 on a side portion 515, 517 of the monitor 520. The side portions 515, 517 may be any area to the right or left of the screen 522, upon which it is suitable to mount the charging hook 500. Similar to the aforementioned lower front portion 523, the side portions 515, 517 may include, in whole or in part, a bezel of the monitor 520.

Figure 20A:
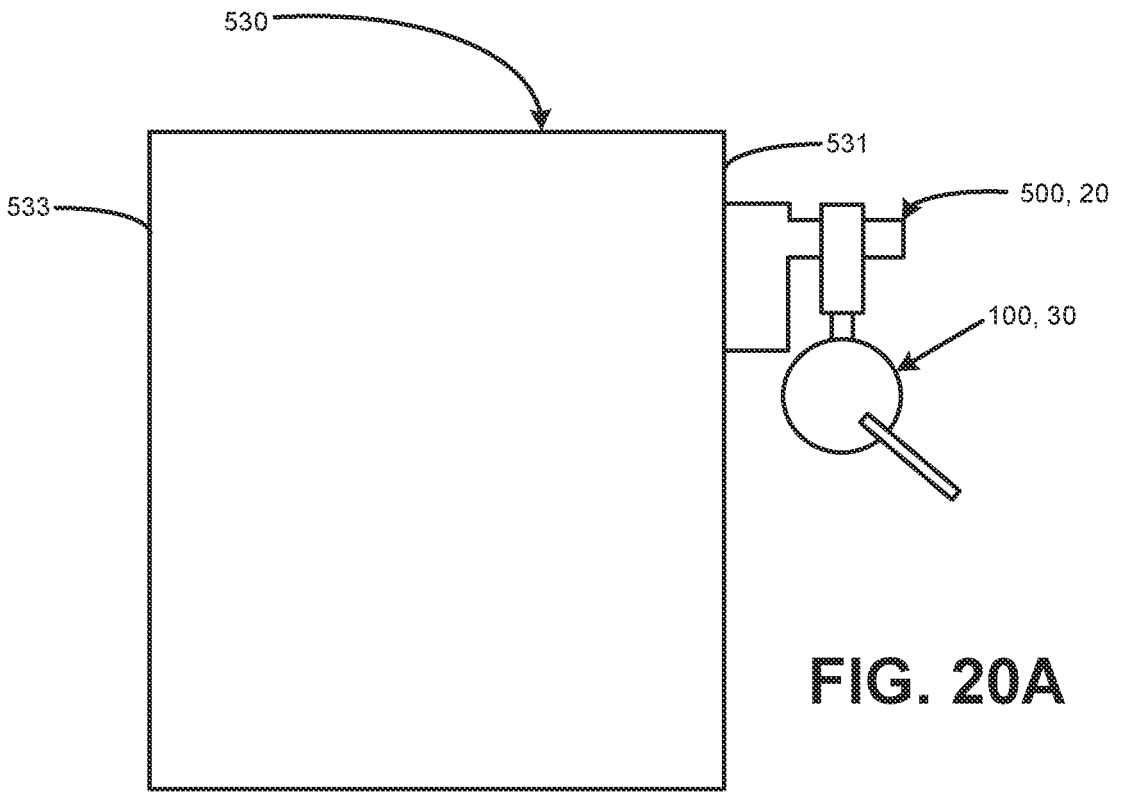
FIG. 20A is a side view of the charging hook of FIG. 18A and the wearable communication device of FIG. 13, within which a portion of the wireless power transfer systems disclosed herein may be implanted, wherein the charging hook is attached to a front side of a computer, in accordance with FIGS. 1-7, 9-19C, and the present disclosure.
Figure 20B:
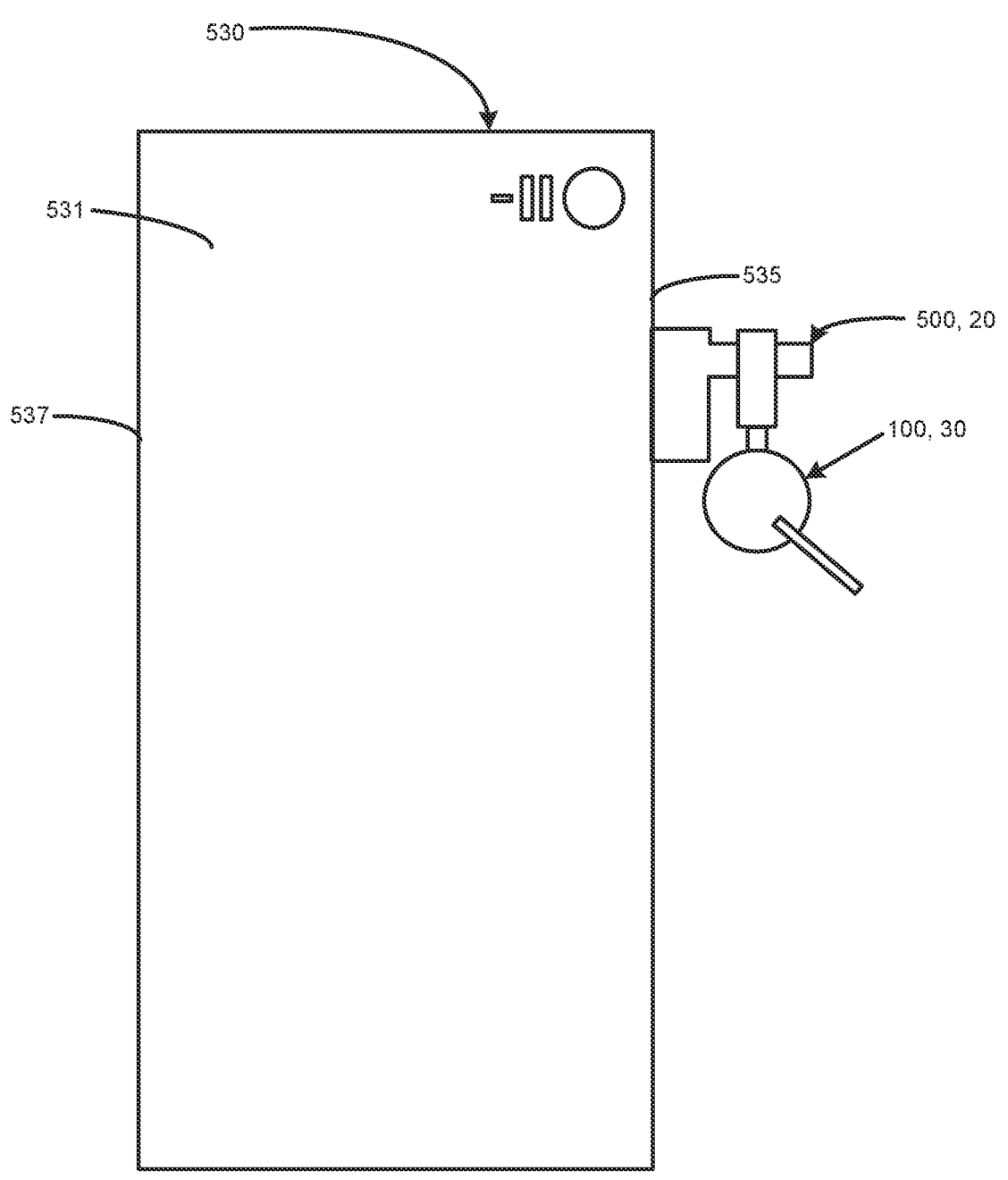
FIG. 20B is a side view of the charging hook of FIG. 18A and the wearable communication device of FIG. 13, within which a portion of the wireless power transfer systems disclosed herein may be implanted, wherein the charging hook is attached to a side of a computer, in accordance with FIGS. 1-7, 9-20A, and the present disclosure.

FIGS. 20A-B illustrate examples wherein the device, upon which the charging hook 500 is attached, is a PC tower 530, or similar computing device. As best illustrated in FIG. 20A, the charging hook 500 may be attached to a front portion 531 of the PC tower 530, while it, additionally or alternatively, may be attached to a rear portion 533 of the PC tower 530. In an additional or alternative embodiment illustrated in FIG. 20B, the charging hook 500 may be attached to the PC tower 530 on a side portion 535, 537. The side portions 515, 517 may be any area to the right or left of the front portion 531 of the PC tower 530, upon which it is suitable to mount the charging hook 500.

Turning now to FIGS. 21A-F, a plurality of embodiments are illustrated, which indicate examples of features utilized in attaching the charging hook 500 to a device and/or features utilized in providing input power to the charging hook 500. However, the example embodiments of FIG. 21 are non-limiting and alternative or equivalent features for mechanically connecting the charging hook 500 to a device and/or electrically connecting the charging hook 500 to input power are certainly contemplated.

Figure 21A:
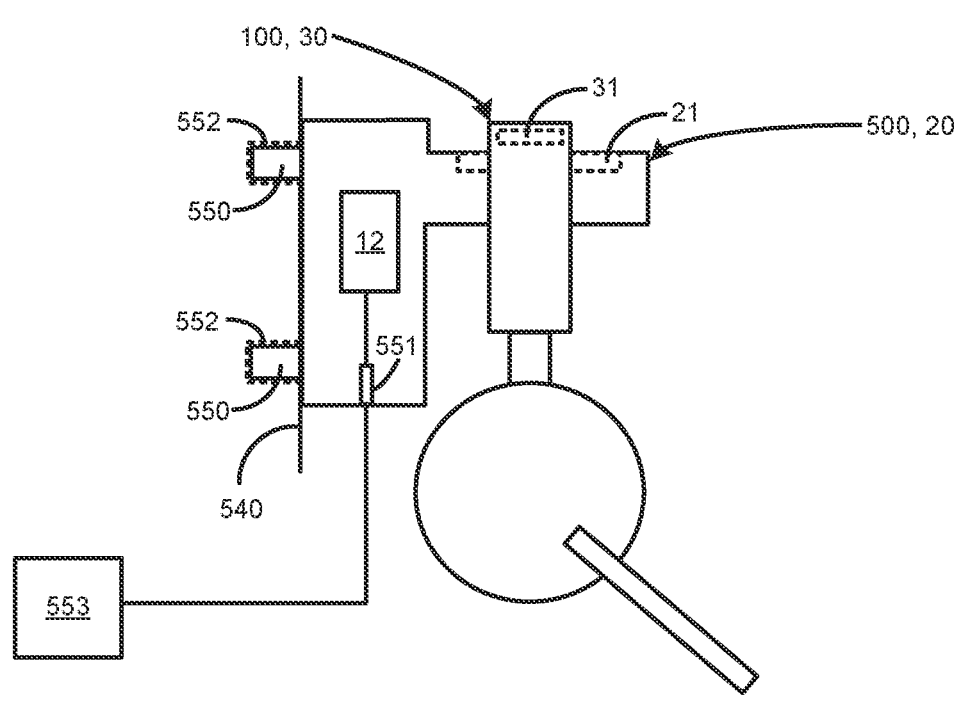
FIG. 21A is a side view, with schematic and mechanical indications, of the charging hook of FIG. 18A, illustrating mechanical features for attaching the charging hook to a device, in accordance with FIGS. 1-7, 9-20B, and the present disclosure.

FIG. 21A illustrates the charging hook 500 having one or more mechanical male structures 550, which are configured to be received by or "mate" with one or more mechanical female structure 552 of a surface 540 of the device upon which the charging hook 500 is to be affixed. The mating of the structures 550, 552 may be configured such that, when mated, the structures 550, 552 hold the charging hook 500 static, with respect to the surface 540. In the example of FIG. 21A, input power 12 may be received via an external input power source 553, which is input through an electrical connector 551, to be utilized as the input power source 12.

Figure 21B:
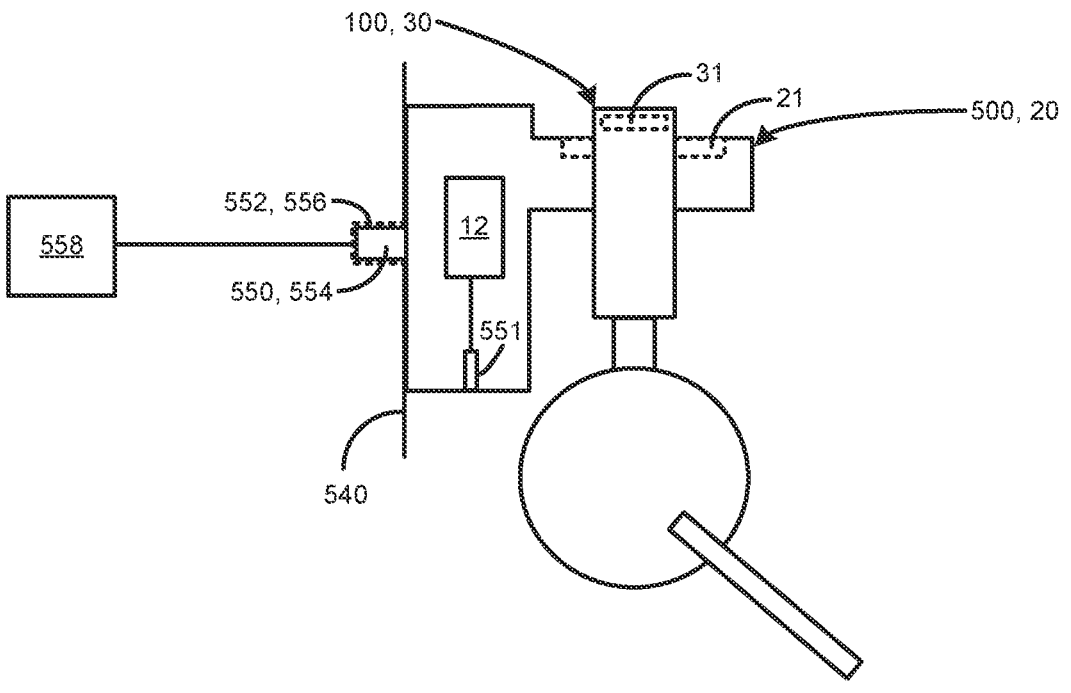
FIG. 21B is a side view, with schematic and mechanical indications, of the charging hook of FIG. 18A, illustrating mechanical features for attaching the charging hook to a device via an electrical connector, in accordance with FIGS. 1-7, 9-21A, and the present disclosure.

In some examples with mating structures 550, 552, such as the embodiment of FIG. 21B, the mechanical male structure 550 of the charging hook 500 may be a male electrical connector 554 and the mechanical female structure 552 may be a female electrical connector 556. In a non-limiting example, the male electrical connector 554 may be a male USB plug and the female electrical connector 556 may be a USB port proximate to the surface 540. In the example of FIG. 21B, the mating of electrical connectors 554, 556 may double as a both an electrical connector, for power, and a mechanical connector, for affixing the charging hook 500 to the surface 540. In such an example, the charging hook 500 may receive input power directly from a power source 558 of the device, which then provides the power from the power source 558, to the charging hook 50, as the input power source 12.

Figure 21C:
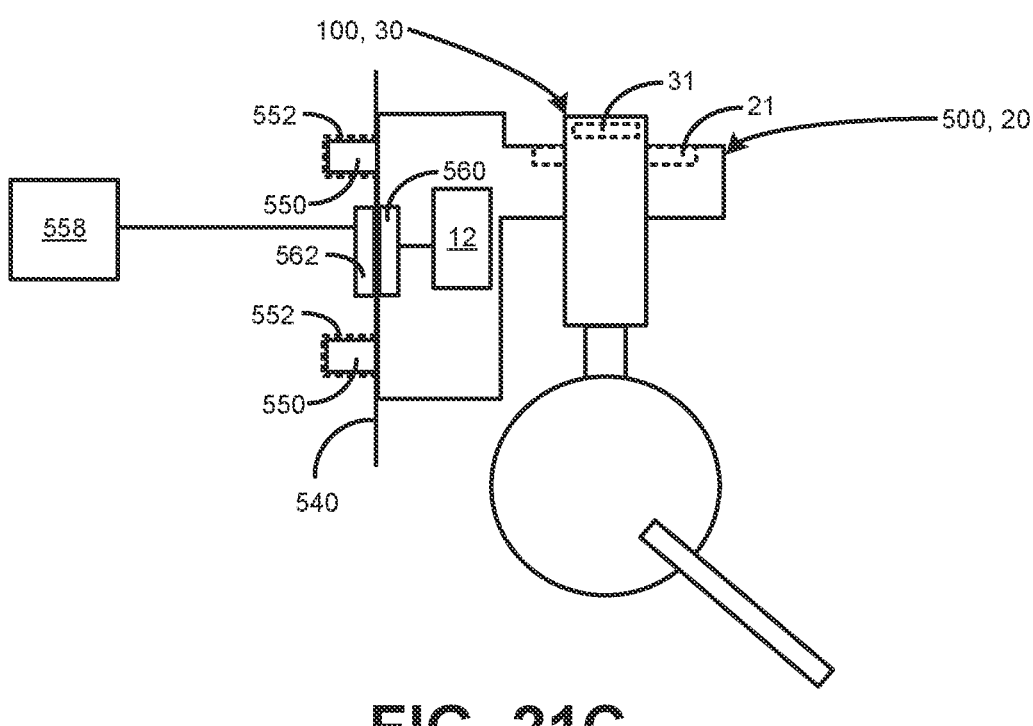
FIG. 21C is a side view, with schematic and mechanical indications, of the charging hook of FIG. 18A, illustrating mechanical features for attaching the charging hook to a device and electrical contacts, in accordance with FIGS. 1-7, 9-21B, and the present disclosure.

As an alternative feature for providing power to the charging hook 500, the example embodiment of FIG. 21C illustrates the charging hook 500 receiving input power 12 from the power source 558 via a physical connection between contacts 560, 562. The charging hook 500 may include a power receiving contact 560, and the device may include a power transmitting contact 562 proximate to the surface 540. In such examples, power is provided to the charging hook 500, when the contacts 560, 562 are physically touching and properly aligned. Accordingly, in such examples, the structures 550, 552 may be configured to position the charging hook 500, relative to the device, such that the contacts 560, 562 are in alignment for powering the charging hook 500.

Figure 21D:
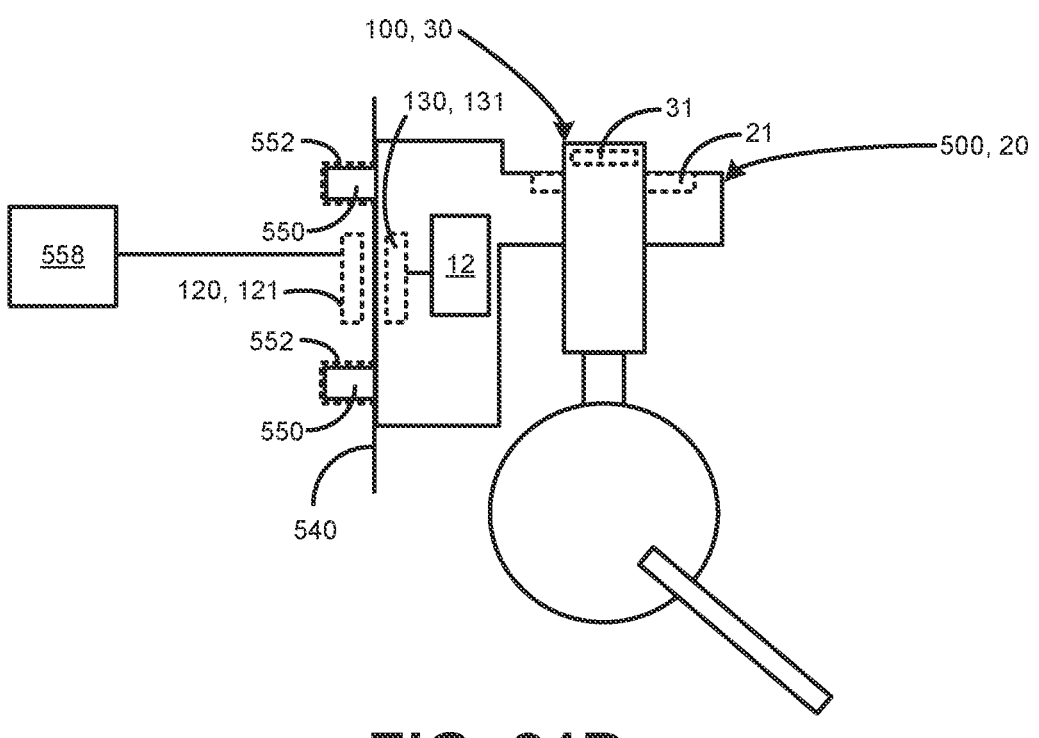
FIG. 21D is a side view, with schematic and mechanical indications, of the charging hook of FIG. 18A, illustrating mechanical features for attaching the charging hook to a device and a wireless power transfer system for powering the charging hook, in accordance with FIGS. 1-7, 9-21C, and the present disclosure.

As yet another alternative feature for providing power to the charging hook 500, the example embodiment of FIG. 21D illustrates the charging hook 500 receiving input power 12 from the power source 558 via an inductive, wireless power connection between a wireless power transmitter 120, associated with the device, and a wireless power receiver 130, associated with the charging hook 500. The wireless power transmitter 120 may include similar or same elements to those of the aforementioned wireless power transmitter 20, and discussed in more detail above; similarly, the wireless power receiver 130 may include similar or same elements to those of the aforementioned wireless power receiver 30, and discussed in more detail above. A receiver antenna 131 of the charging hook 500 is configured to receive usable electrical energy from a transmitter antenna 21 that is proximate to the surface 540. The wireless power receiver 130 then provides the received electrical energy as power for the input power source 12. In such examples, the mechanical structures 550, 552 may be configured to position the charging hook 500, relative to the device, such that the antennas 121, 131 are in alignment for proper wireless power transfer from the transmitter antenna 121 to the receiver antenna 131.

Figure 21E:
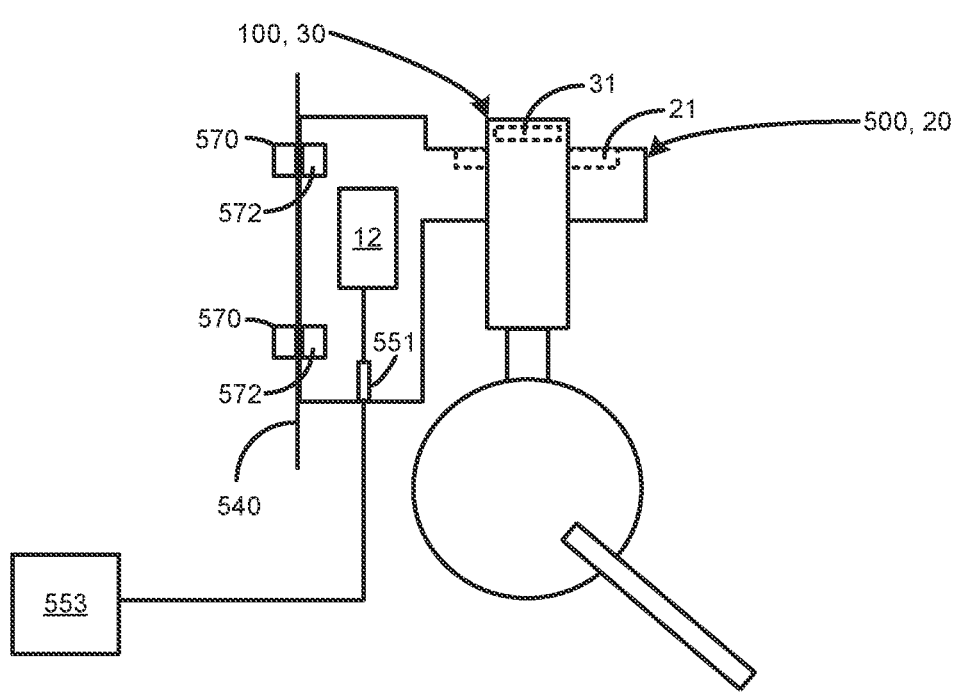
FIG. 21E is a side view, with schematic and mechanical indications, of the charging hook of FIG. 18A, illustrating magnets for attaching the charging hook to a device, in accordance with FIGS. 1-7, 9-21D, and the present disclosure.
Figure 21F:
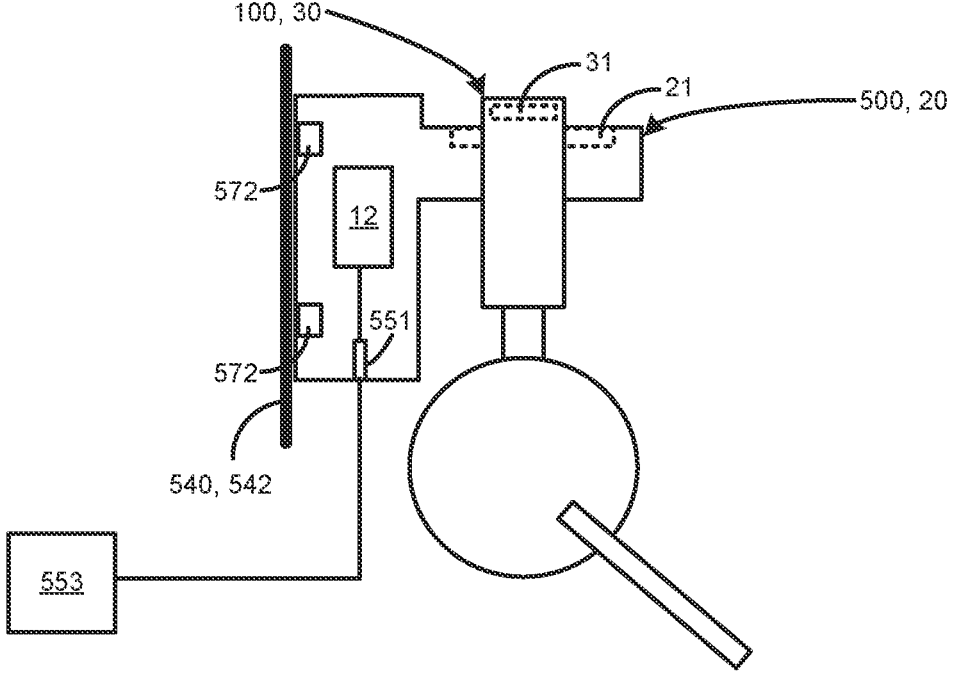
FIG. 21F is a side view, with schematic and mechanical indications, of the charging hook of FIG. 18A, illustrating magnets for attaching the charging hook to a metal surface of a device, in accordance with FIGS. 1-7, 9-21E, and the present disclosure.

FIG. 21E is an example embodiment, wherein magnets 570, 572 are utilized for attaching the charging hook 500 to the device at the surface 540. In such examples, the charging hook 500 includes one or more first magnets 572 and the device includes one or more second magnets 570 proximate to the surface 540. In such examples, the first magnets 572 and the second magnets 570 will have opposing polarities, such that they are configured to attract one another when positioned proximate to one another. In an alternative embodiment involving magnets, FIG. 21F is an example embodiment, where only the first magnets 572 are utilized and the surface 540 is a metal surface 542. In such an embodiment, the first magnets 572 are configured to attract or stick to a metal surface 542.

Figure 22C:
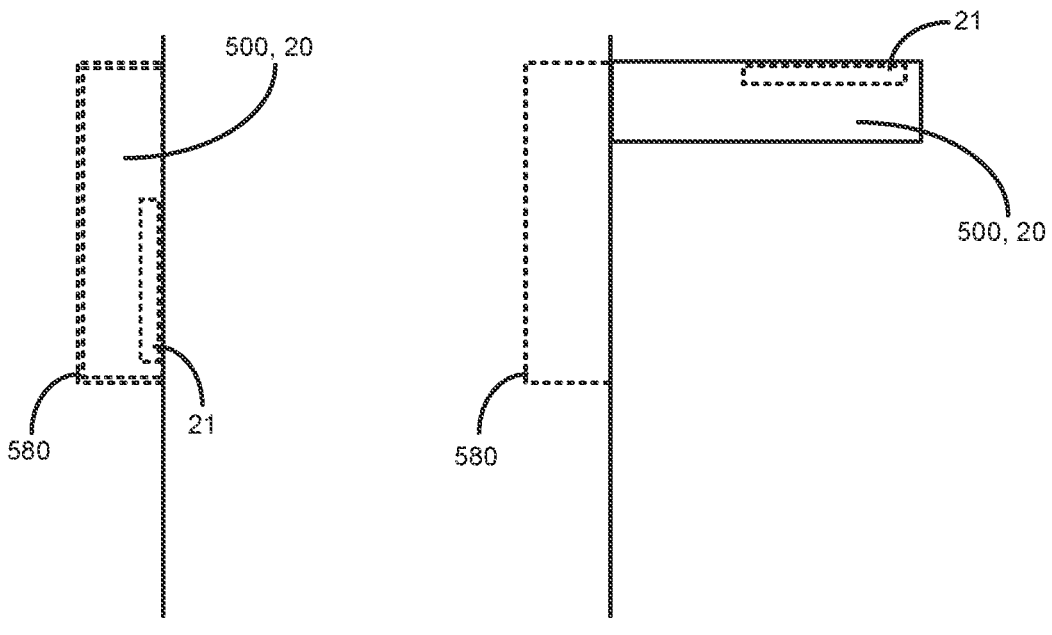
FIG. 22C is a side view of the charging hook of FIG. 18A, as an embedded device of an electronic device, in its "folded-out" position, with a headset in position for charging, in accordance with FIGS. 1-7, 9-22A, and the present disclosure.
Figure 22C:
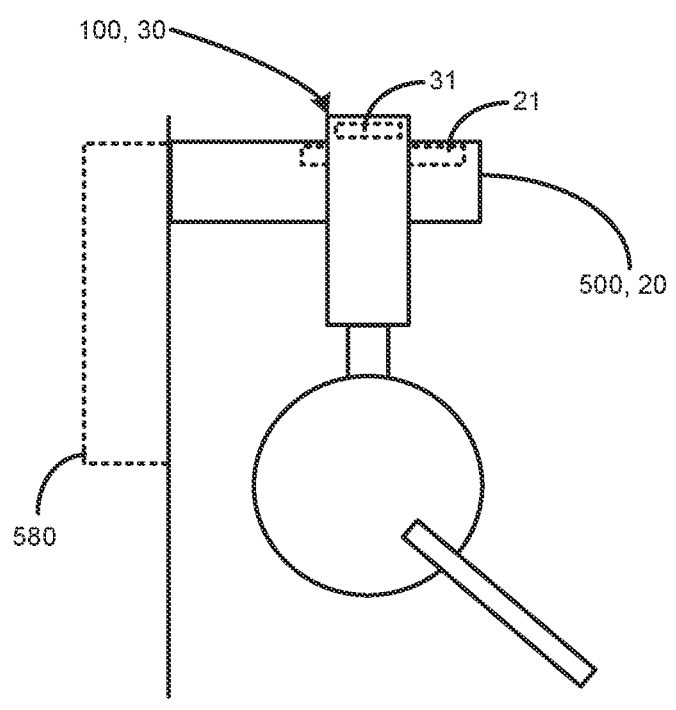

FIGS. 22A-C illustrate different positioning for the charging hook 500, when the charging hook 500 is integrated as a feature of the device, when the device is, for example, a PC tower or a monitor. In such examples, the charging hook 500 will receive input power 12 from the device itself. As best illustrated in FIG. 22A, when not in use, the charging hook 200 may fit into a recess 580 of the device, or may be otherwise folded down—note, the charging hook need not be foldable or hidable and may stay extended from the device permanently. FIG. 22B illustrates when the charging hook 500 is extended out from the recess 580 and placed in a position for charging the wearable communications device 100. Such extension out from the recess 580 may be done manually by a user and/or may be extended by a extending device of or associated with the device upon which the charging hook 500 is a feature. Such extending devices may include, but are not limited to including, actuators. Once the charging hook 500 is in an extended position, the wearable communications device 100 may be placed upon the charging hook 500, as best illustrated in FIG. 22C, for wirelessly charging the wearable communications device 100.

Figure 23:
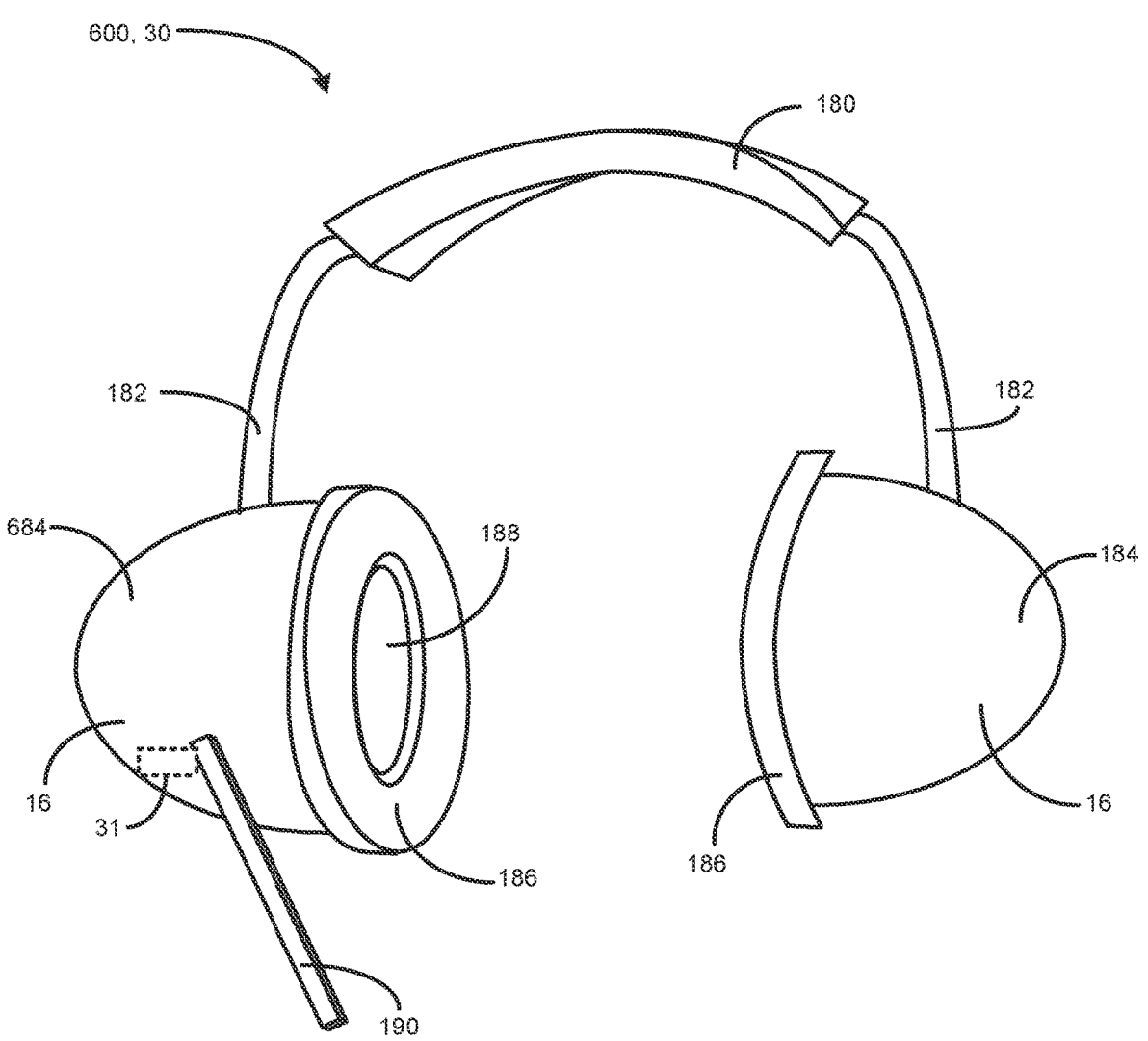
FIG. 23 is a perspective view of a wearable communication device, within which a portion of the wireless power transfer systems disclosed herein may be implemented in accordance with FIGS. 1-7, 9-12, and the present disclosure.
Figure 24:
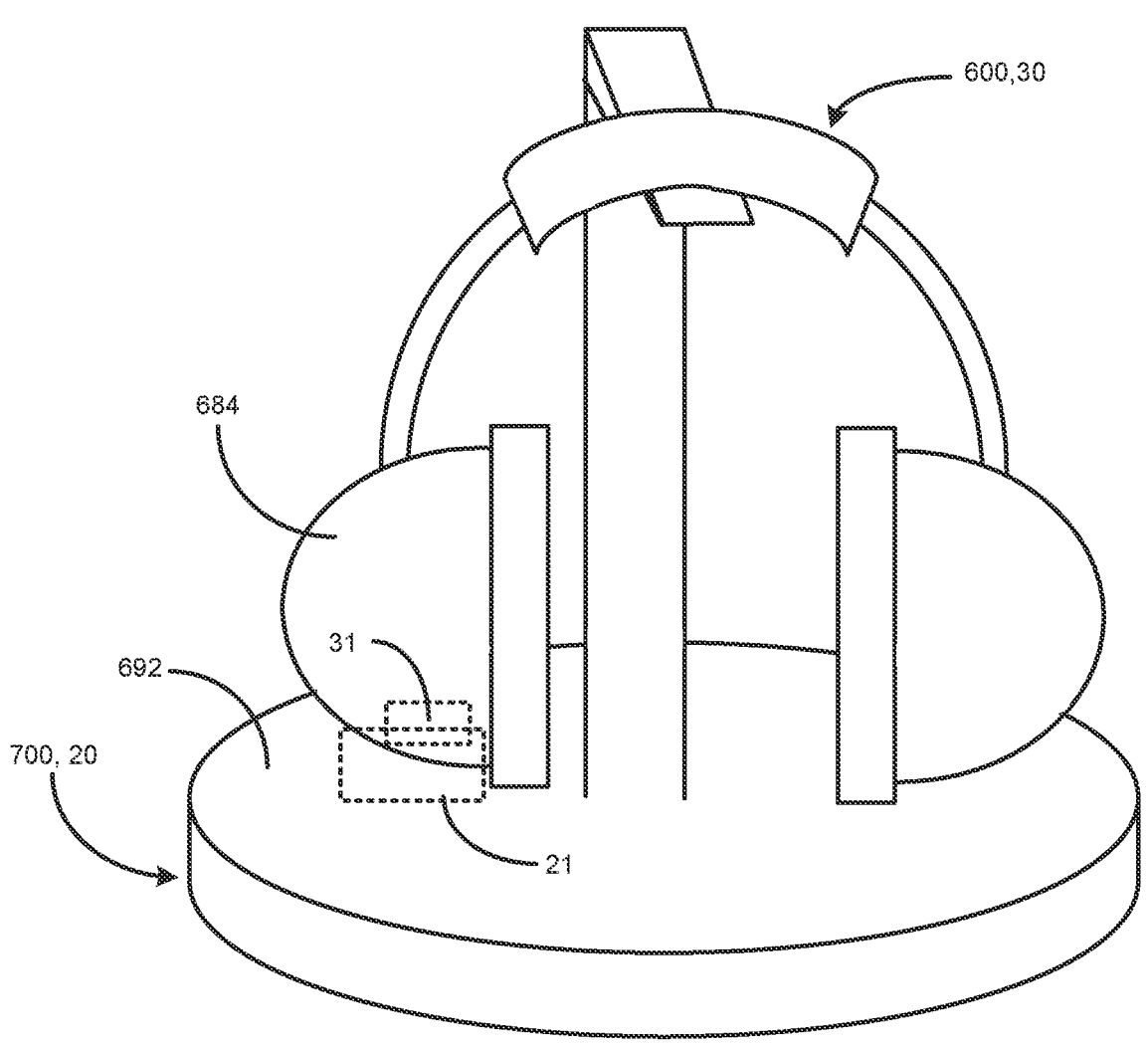
FIG. 24 is a perspective view of a further embodiment of the wireless power transfer system of FIG. 15, in accordance with FIGS. 1-7, 9-17, and the present disclosure.

Turning now to FIGS. 23 and 24, a simplified perspective view of another embodiment of a wireless power transmission system 10 comprising a wearable communication device 600 and another charging base 700. The wearable communication device 600 is similar to the previously presented embodiments, including similarly labelled components thereof, except the wireless receiver system 30 is positioned within an earcup 684. The charging base 700 is similar to previously presented embodiments except for a transmission system 20 in a base support 792 also includes the transmission antenna 21 within the base support 792. This configuration may permit and/or require the alignment of the transmission antenna 21 and the receiver antenna 31 to be accomplished over a larger separation distance 17.

It is also contemplated that the configuration disclosed in FIG. 18 could be utilized to convert a wireless headset that does not include the wireless power receiver system 30 built-into an earcup 684. Instead, a wireless headset that includes a connector for plugging-in a charging cable may receive an external dongle (not shown) that contains the wireless power receiver system 30. A user would only need to purchase a kit containing the dongle and the charging base 700 to add a wireless power transfer system 10 to a previously owned wireless headset.

Figure 25:
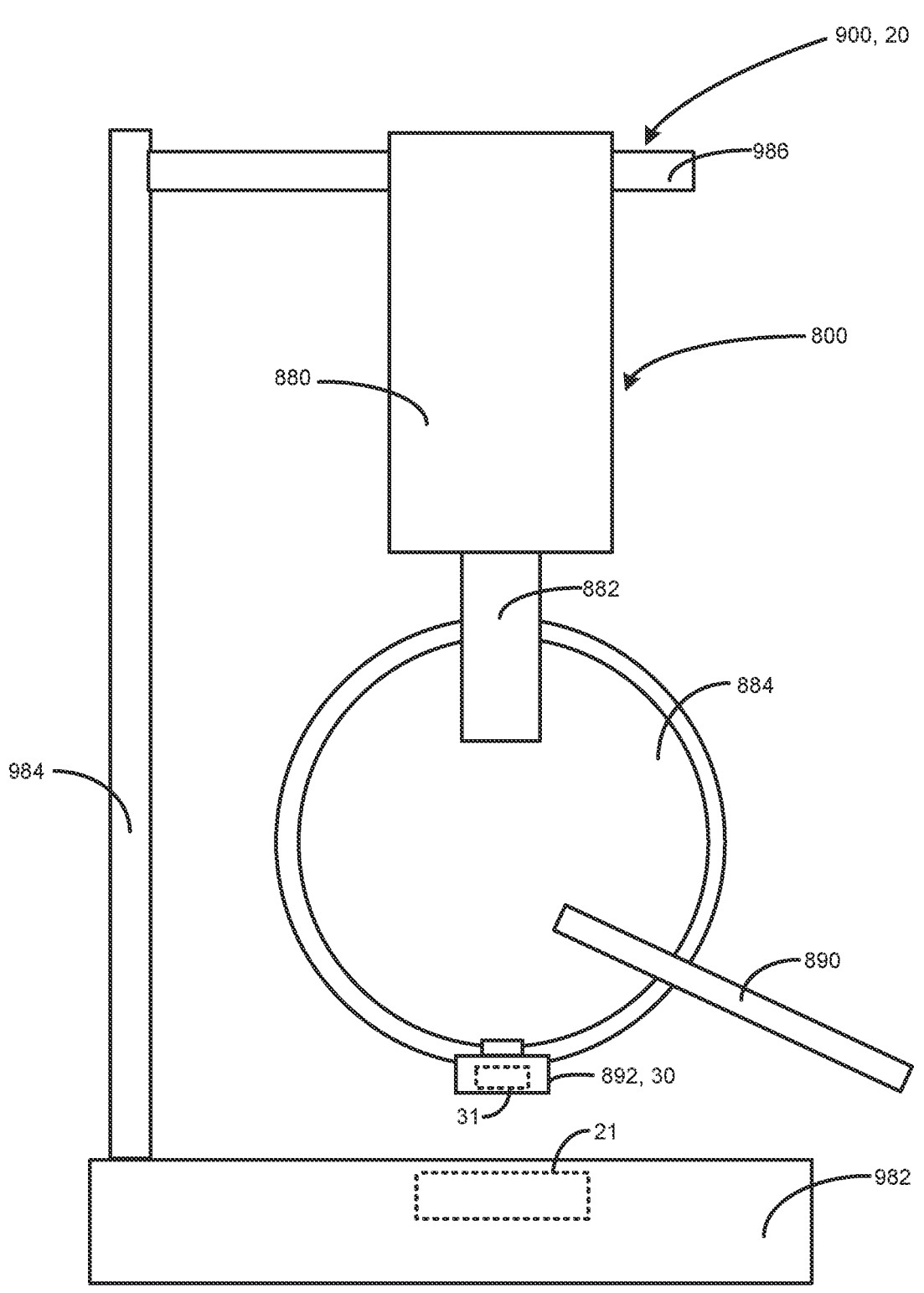
FIG. 25 is a side view of further embodiment of a wireless power transfer system for wearable communication devices, in accordance with FIGS. 1-7, 9-17, 24, and with the present disclosure.

Turning now to FIG. 25, a side view of another embodiment wireless power transfer system 10 for a wearable communication device 800, which is similar to the wearable communication device 100, except that it does not contain a wireless receiver system 30. As depicted in FIG. 25, the wearable communication device 700 comprises a headband 880, adjustment bars 882, earcups 884, and a microphone boom 790. The wearable communication device 800 (a wireless headset) is natively configured to be charged via a charging cable (not shown) plugged into a charging port/connector (not shown). A dongle 892 is plugged into the charging port located in the earcup 884. The dongle 892 includes the wireless receiver system 30, which includes a receiver antenna 31. The wireless power transfer system 10 also includes a charging base 900 comprising a baseplate 982, a vertical support member 984, and a horizontal support member 986. A wireless transmission system 20, including a transmission antenna 21, is provided in the baseplate 982 As depicted the charging base 900 is supporting the wearable communication device 800 such that the receiver antenna 31 is positioned proximate the transmission antenna 21. In this configuration the dongle 892, combined with the charging base 900 converts the wearable communication device 800 to device that may be charged wirelessly instead of connecting a charging cable.

It is contemplated, that the charging port of a wearable communication device 800 may not permit proper alignment of the receiver antenna 31 and the transmission antenna 21 for coupling and wireless power transfer to occur. The charging base 900 may be configured in different embodiments that provide a favorable position of the dongle 892 in relation to transmission antenna 21. One non-limiting example would be for the charging port located on a back side of the earcup 784. The transmission antenna 21 or the entire transmission system 20 may be located in the vertical support member 984 in a favorable position for coupling with the receiver antenna 31 when the dongle 892 is attached. It is also contemplated that the charging base 900 may be configured to support the wearable communication device 800 in different configurations from what is depicted in FIG. 25 to favorably position the transmission antenna 21 proximate the receiver antenna 31 of an attached dongle 892.

Figure 26:
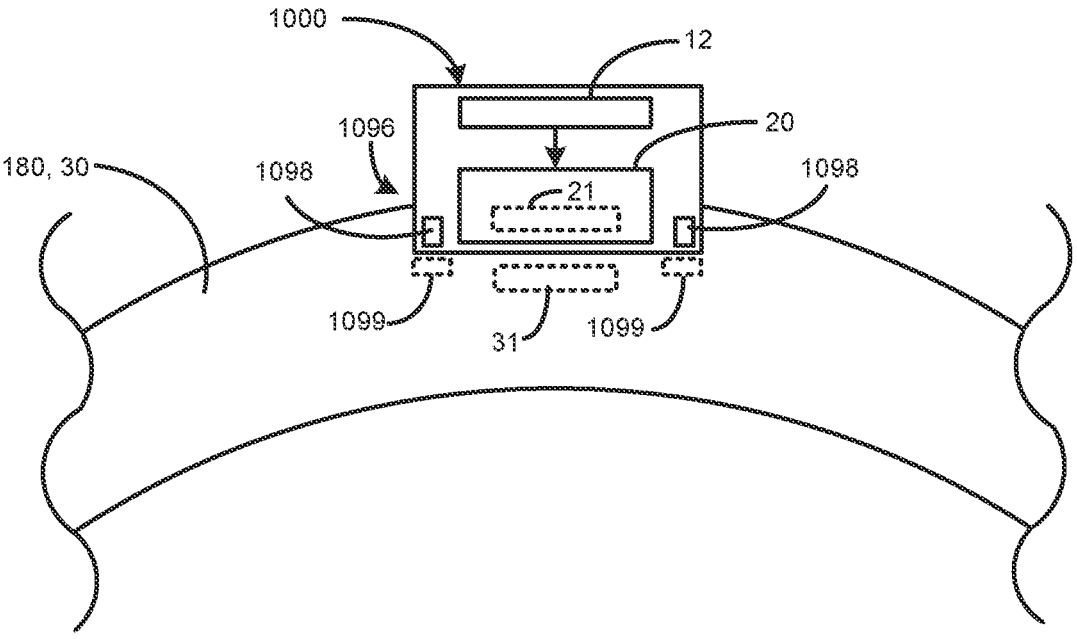
FIG. 26 is a front view of a transmitter device and a portion of the wearable communication device of FIG. 13, within which a portion of the wireless power transfer systems disclosed herein may be implemented in accordance with FIGS. 1-7, 9-17, and the present disclosure.

FIG. 26 is a front view of a transmitter device 1000, which may be attached to a portion of the headband 180 for wirelessly charging the wearable communication device 100, of FIG. 13, during use by a user. The transmitter device 1000 is configured to be retained on the headband 180 of the wearable communication device 100. Only a portion of the headband 180 of the wearable communication device 100 is depicted in FIG. 26.

In particular, the transmitter device 1000 comprises a transmitter housing 1092. In the present configuration it is contemplated that the transmitter device 1000 integrates a wireless transmission system 20, in accordance with the present disclosure. The components of the wireless transmission system 20 may be placed throughout the transmitter housing 1092. Specifically, in the present embodiment, a transmitter antenna 21 and an input power source 12 may be positioned within the within the transmitter housing 1092 as well as the remaining components of a wireless transmission system 20, in accordance with the present disclosure. The input power source 12 is linked to the transmission system 20 and the transmitter antenna 21. When transmitter 200 is positioned on the wearable communication device 100, the transmitter antenna 21 aligns with the receiver antenna 31 at an orientation and distance. In this alignment, the transmission antenna 21 is able to resonantly couple with the receiver antenna 31. In this way, the transmitter device 1000 charges the wearable communication device 100, so that it may be employed by a user, while the user is using the wearable communication device 100 for listening and/or communicating. Thus, the wearable communication device 100 can be charged during use, without having to connect a physical charging cable to the wearable communication device 100.

As depicted in FIG. 24, the transmitter device 1000 is retained on the headband 180 by a retention mechanism 1094, which comprises at least a pocket 1096 that a portion of the transmitter housing 1092 is configured to be at least partially positioned within. The retention mechanism 1094 may further comprise one or more transmitter magnets 1098 positioned within or on the transmitter housing 1092 and headband magnets 1099. The headband magnets 1099 may be positioned within the headband 180 as depicted, or alternatively, in a surface of the pocket 1096. It is contemplated that the transmitter magnets 1098 and headband magnets 1099 attract together with enough retention force to retain the transmitter device 1000 in place during standard activities by a user of the wearable communication device 100. It is also contemplated that the retention force is easily overcome by the user to remove the transmitter device 1000 when the wearable communication device 100 is fully charged. It is also contemplated that the attraction of the transmitter magnets 1098 and headband magnets 1099 may aid the user in placing the transmitter device 1000 in the pocket 1096 when the user attaches the transmitter 1000 for charging the wearable communication device 100.

Still referring to FIG. 26, the retention mechanism 1094 is configured to retain the transmitter device 1000 such that the transmitter antenna 21 is coupled with and may transmit the power signal to the receiver antenna 31. In the present embodiment the wireless receiver system 30 is also positioned within the headband 180 of the wearable communication device 100. It is contemplated that the wireless receiver system 30 and/or the receiver antenna 31 may be positioned proximate to the headband 180 and/or within the headband 180. It is contemplated that the retention mechanism 1092 may be configured to retain the transmitter housing in a variety of embodiments different than what is depicted in FIG. 26. In one alternative embodiment, the transmitter housing 1092 may include a channel that is shaped to slide onto a complementary shaped portion of the headband 180. In a further embodiment the transmitter housing may include one or more clips that attach to retention points of the surface of the headband 190. It is contemplated that the transmitter housing 1092 may be retained proximate to, on, or at least partially within the headband 180 by one or more different types of retention mechanisms, which may include e.g., magnets, hook and loop, mechanical connections such as clips, latches, a rail and a channel, and an elastic retainer. One having ordinary skill in the art would understand the multitude of ways to retain the transmitter device 1000 such that the transmitter antenna 21 may transmit the power signal to the receiver antenna 31.

However, it will be appreciated that the use of the transmitter device 1000 with a retention mechanism for charging does not foreclose other charging configurations for the wearable communication device 100.

Figure 27:
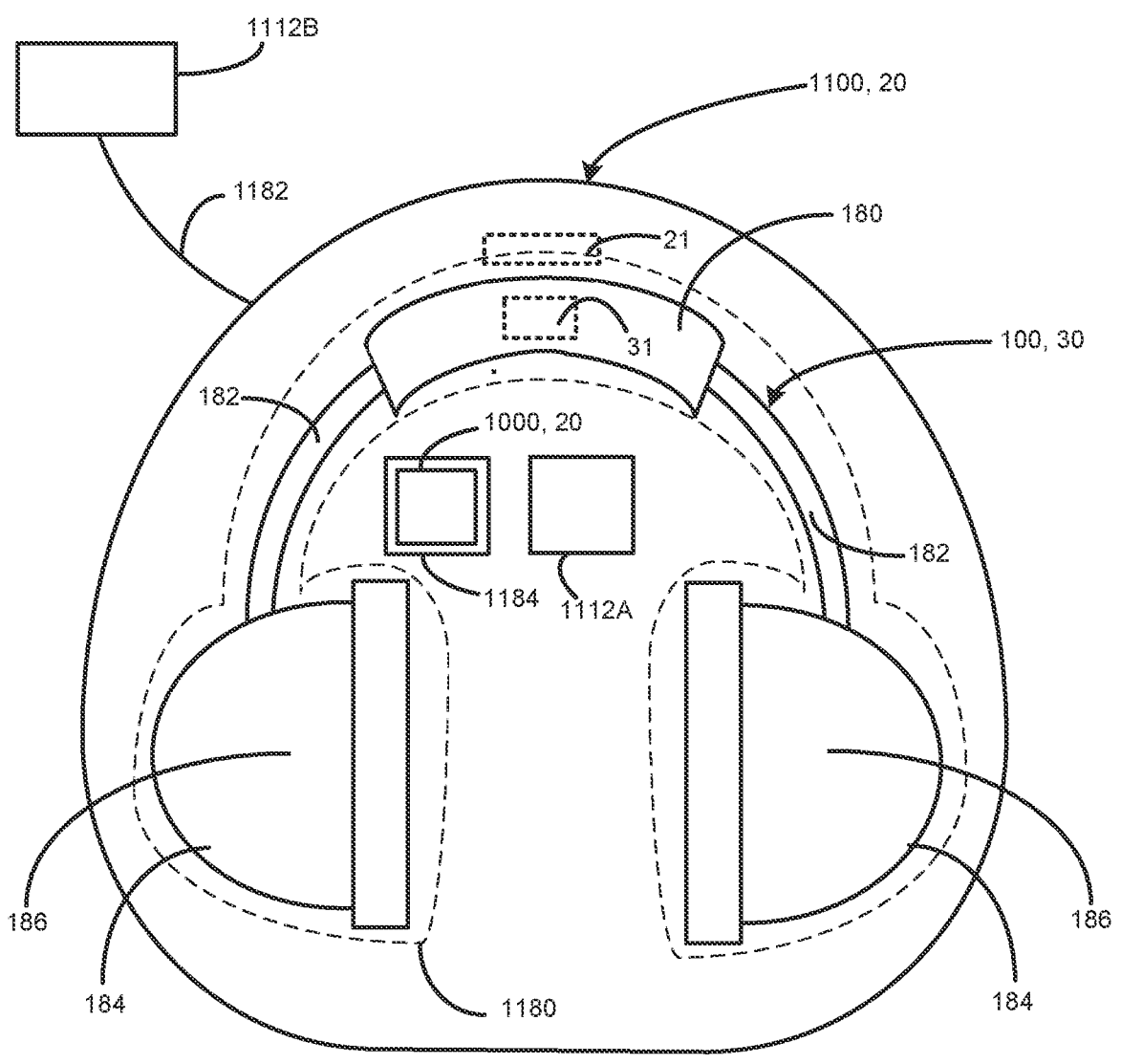
FIG. 27 is a top view of the wearable communication device of FIG. 13 positioned within another embodiment of a wireless transmitter, within which a portion of the wireless power transfer systems disclosed herein may be implemented in accordance with FIGS. 1-7, 9-17, 26, and the present disclosure.

With this in mind, FIG. 27 depicts an alternative embodiment of a wireless power transfer system that includes the wearable communication device 100 positioned within a charging case 1100. The wearable communication device is positioned within a shaped recess 1180 in the charging case 1100. The wearable communication device 100 is configured with the earcups rotated for travel and/or storage. Many users require the ability to charge mobile devices such as a wearable communication device 100 while traveling and not in use. It is contemplated that the charging case may be configured such that the receiver antenna 31 is positioned and aligned with a transmission antenna 21 of a wireless transmission system 20 contained within the confines of the case. The charging case may include an internal input power source 1112a that is configured to transfer power through the wireless transmission system 20 when the charging case 1100 is not connected to an external source of power. The charging case may include a wired connection (not shown) for connecting a cable 1182 to an external input power source 1112b. It is contemplated that when the charging case 1100 is connected to the external input power source 1112b, the internal input power source 1112a and the wearable communication device 100 may be charged simultaneously. Alternatively, an internal charge controller (not shown) of the charging case 1100 may prioritize one of the internal input power source 1112a or the wearable communication device 100 over the other.

It is also contemplated that the transmitter device 1000 may be stored in a recess 1184 and electrically connected to the charging case 1100 separately from the wearable communication device 100. The charging case 1100 may charge the transmitter device 1000, the wearable communication device 100, and the internal input power source 1112a simultaneously or may prioritize one over the others. In an alternative embodiment, the transmitter device 200 may be stored in and electrically connected to the charging case 1100 and may function as the internal input power source 1112a.

Figure 28:
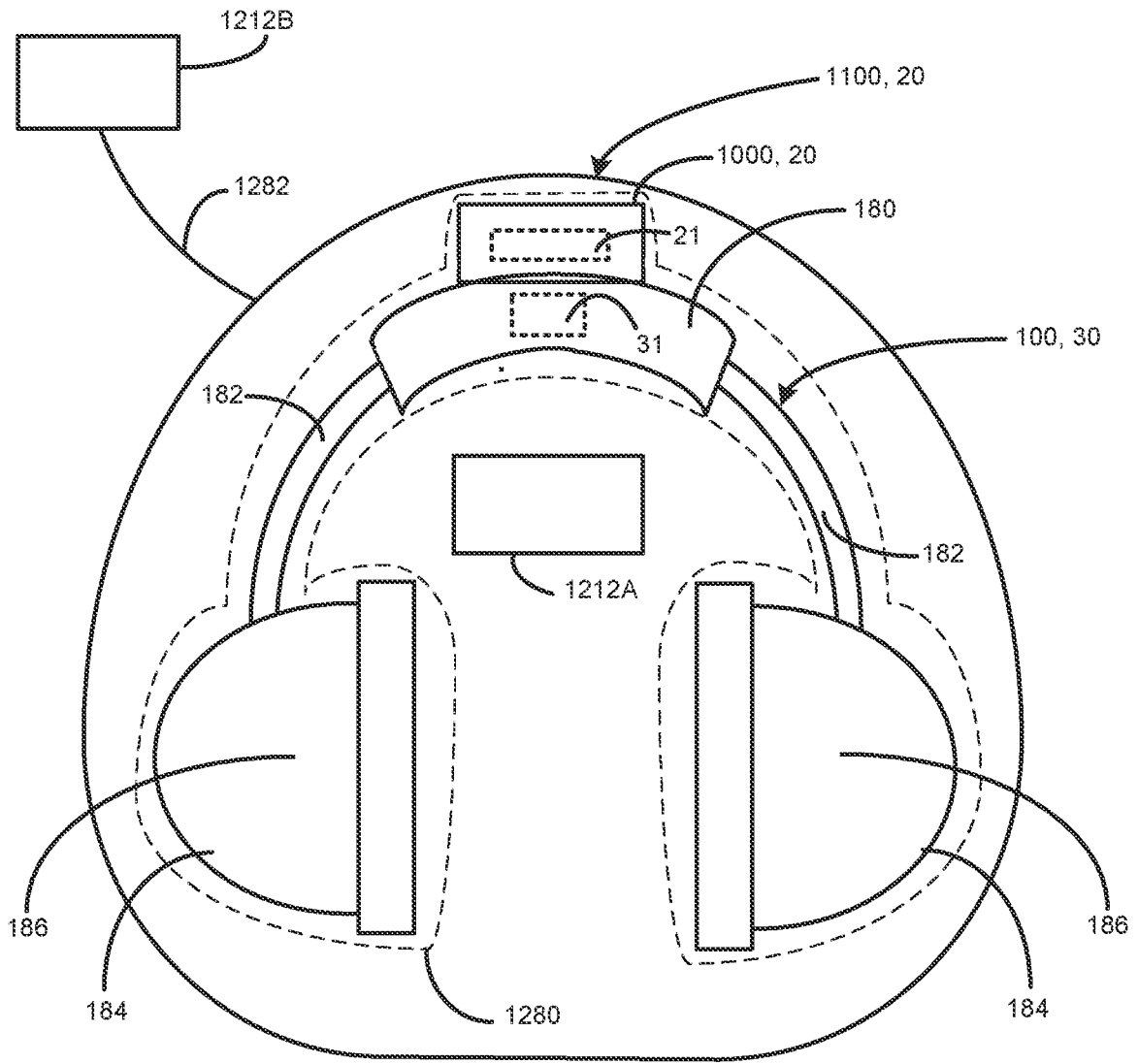
FIG. 28 is a top view of another embodiment of the wireless power transfer system of FIG. 26, in accordance with FIGS. 1-7, 9-17, 26, 27, and the present disclosure.

Turning now to FIG. 28, an alternative embodiment of a wireless power transfer system that includes the wearable communication device 100 positioned within a charging case 1200. The charging case 1200 is similar to the charging case 1100 in that it includes a recess 1280 for retaining the wearable communication device 100 in a travel and/or storage position with the earcups 184 rotated. The recces 1280 is further configured to retain the wearable communication device 100 while the transmitter device 1000 is attached to the headband 180 as disclosed and discussed in the embodiment of FIG. 27. The transmitter device 1000 is electrically connected to the charging case 1200. The charging case 1200 may include an internal input power source 1212a and may be connected to an external input power source 1212b via a cable 1282. The charging case 1200 may employ pass-through charging via the transmitter 1000 so that a separate wireless transmission system 20 is not necessary. Thus, the charging case 1200 may charge the wearable communication device 100 without having a dedicated internal wireless transmission system 20. It is contemplated that the internal input power source 1212a may charge both the wearable communication device 100 and the input power source 20 within the transmitter 1000 simultaneously or one may be prioritized over the other.

It is contemplated that the transmitter 1000 may include a cable connection for connecting to the charging cases 1100, 1200. It is also contemplated in an alternative embodiments the transmitter 1000 may function as the internal input power source 1212a. Thus, the recess 1280 may be configured to retain the transmitter device 1000 for charging the input power source 12 within the transmitter 1000 when the wearable communication device 100 is in use by a user. It is further contemplated that in an alternate embodiment the transmitter device 1000 may include a wireless receiver system (not shown) so that the transmitter device 1000 may be wirelessly charged by the charging cases 1100, 1200, or an external separate wireless charging device (not shown).

It is also contemplated that an alternative embodiment of the transmitter device 1000 may use a single antenna and wireless power transfer system to act as a transmitter or receiver depending on the configuration. For example, when coupled with wearable communication device 100 the transmitter device 1000 may function as a transmitter to charge the wearable communication device 100. Alternatively, the same transmitter device 1000 may function as a receiver to charge from an input power source 12 when placed on another separate external wireless transmitter and the respective coils are aligned for coupling and wireless power transfer. Thus, a user could place the transmitter device 1000 on an appropriate wireless charging pad to recharge the transmitter device 1000 for the next time it is needed to charge the wearable communication device 100.

It is also contemplated that the receiver system 30 and the receiver antenna 31 may be placed in other portions or bodies of the wearable communication device 100 (not shown) for coupling with the transmitter device 1000. In one embodiment, the receiver system 30 and the receiver antenna 31 may be positioned proximate to, on, or within one of the earcups 184. A retention mechanism 294, as disclosed in the detailed description of FIG. 26, may be employed to retain the transmitter 20 proximate to at least the receiver antenna 31 regardless of the location of the receiver antenna 31 relative to the location within or on the wearable communication device 100.

An alternative embodiment of the wearable communication device 100 is also contemplated that includes more than one wireless power receiver system 30. For example, a first receiver system 30 may be positioned within the headband as disclosed and depicted in relation to FIG. 14 and configured to receive power from any of the embodiments of the transmitter device 1000 disclosed. A second receiver system 30 may be positioned in the earcup 184 of the wearable communication device 100 for charging the wearable communication device 100 by placing it on a wireless charging pad. An alternative embodiment may include only one wireless power receiver system 30 and two receiver antennas 31 in different locations. For example, a first receiver antenna 31 may be positioned in the headband 180 and a second receiver antenna 31 may be positioned in an earcup 184. Thus, the wearable communication device 100 may be configured to be charge by a transmitter 1000 in accordance with the present disclosure or by placing the wearable communication device 100 on a wireless charging pad.

Failure to charge a wearable communication device, such as a headset for use with a desktop computer or mobile device, will render it useless when needed after the battery is fully discharged. Users commonly forget to charge devices after a long session of use whether it is for professional purposes or for entertainment, such as listening to entertainment/informative content and/or use as a uni-directional or bi-directional communications device while playing console or computer games. By providing a wireless transmission system within a wearable communication device, configured such that hanging the device on a charging stand automatically aligns the device for wireless charging, the user experience will be greatly enhanced. This novel configuration will satisfy a need in the market for easily rechargeable wearable communication devices that users are not likely to forget to recharge when they are finished with the wearable communication device.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

While illustrated as individual blocks and/or components of the wireless transmission system 20, one or more of the components of the wireless transmission system 20 may combined and/or integrated with one another as an integrated circuit (IC), a system-on-a-chip (SoC), among other contemplated integrated components. To that end, one or more of the transmission control system 26, the power conditioning system 40, the sensing system 50, the transmitter coil 21, and/or any combinations thereof may be combined as integrated components for one or more of the wireless transmission system 20, the wireless power transfer system 10, and components thereof. Further, any operations, components, and/or functions discussed with respect to the wireless transmission system 20 and/or components thereof may be functionally embodied by hardware, software, and/or firmware of the wireless transmission system 20.

Similarly, while illustrated as individual blocks and/or components of the wireless receiver system 30, one or more of the components of the wireless receiver system 30 may combined and/or integrated with one another as an IC, a SoC, among other contemplated integrated components. To that end, one or more of the components of the wireless receiver system 30 and/or any combinations thereof may be combined as integrated components for one or more of the wireless receiver system 30, the wireless power transfer system 10, and components thereof. Further, any operations, components, and/or functions discussed with respect to the wireless receiver system 30 and/or components thereof may be functionally embodied by hardware, software, and/or firmware of the wireless receiver system 30.

In an embodiment, a ferrite shield may be incorporated within the antenna structure to improve antenna performance. Selection of the ferrite shield material may be dependent on the operating frequency as the complex magnetic permeability ($\mu=\mu'-j*\mu$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A wireless power transfer system for charging a wearable communication device comprising:
   a headset comprising:
   a headband;
   at least one earcup; and
   a wireless power receiver system comprising:
     a receiver antenna operable to (i) couple with a transmitter antenna via an alternating electromagnetic field, wherein the alternating electromagnetic field is operable to deliver power and in-band data to the wireless power receiver system and (ii) produce an alternating current ("AC") power signal based on the alternating electromagnetic field, wherein the receiver antenna is positioned proximate to or within the headset;
     a power conditioning system operable to (i) receive the AC power signal, (ii) convert the AC power signal to a DC power signal, and (iii) provide the DC power signal to, at least, a load associated with the wireless power receiver system;

a receiver control system;

a controller capacitor electrically connected in series with a data input of the receiver control system; and a voltage isolation circuit comprising:

a first isolation capacitor electrically connected to the receiver antenna and operable to receive the AC power signal; and a second isolation capacitor electrically connected in series with respect to the first isolation capacitor and operable to provide the AC power signal to the power conditioning system, wherein the voltage isolation circuit is electrically connected to the controller capacitor at a node between the first isolation capacitor and the second isolation capacitor, wherein the controller capacitor is operable to (i) receive the AC power signal from the voltage isolation circuit, the AC power signal having a range of voltages and including the in-band data, (ii) regulate the AC power signal to generate a scaled AC power signal having a reduced range of voltages while maintaining the in-band data, (iii) provide the in-band data, in-band of the scaled AC power signal, to the data input of the receiver control system via the controller capacitor; and (iv) isolate the reduced range of voltages of the scaled AC power signal at the receiver control system from a load voltage at the load associated with the wireless power receiver system and a charging base comprising:

a transmitter antenna operable to (i) produce the alternating electromagnetic field and (ii) couple with the receiver antenna via the alternating electromagnetic field; and a housing comprising a support arm and a base, wherein the transmitter antenna is positioned proximate to or within one or more of the support arm, the base, and combinations thereof, and wherein the support arm is configured to retain the headband and position the receiver antenna to receive the power and the in-band data from the transmitter antenna.

2. The wireless power transfer system of claim 1, wherein the receiver antenna couples at an operating frequency in a range of about 13.553 MHz to about 13.567 MHz.

3. The wireless power transfer system of claim 1, wherein an output power of the transmitter antenna is greater than about 1 Watt.

4. The wireless power transfer system of claim 1, wherein the at least one earcup includes at least one electroacoustic transducer.

5. The wireless power transfer system of claim 4, wherein the at least one electroacoustic transducer comprises one or more of a speaker and a microphone.

6. The wireless power transfer system of claim 1, wherein the at least one earcup is configured as one of an on-ear earcup and an around-ear earcup.

7. The wireless power transfer system of claim 1, wherein the at least one earcup includes a first earcup and a second opposed earcup.

8. The wireless power transfer system of claim 1, wherein:

the base comprises a base clip configured to attach to a surface, the housing further comprises a vertical support that extends from the base clip, and the support arm extends outward from the vertical support.

9. The wireless power transfer system of claim 1, wherein the charging base comprises a charging hook that is configured to attach to a given electronic device.

10. The wireless power transfer system of claim 9, wherein the given electronic device comprises one or both of a computing device or a display.

11. A Near-Field Communications Wireless Charging (NFC-WC) system for charging a wearable communication device comprising:

a headset comprising:

a headband;

at least one earcup; and an NFC-WC receiver antenna operable to (i) couple with a NFC-WC transmitting antenna via an alternating electromagnetic field, wherein the alternating electromagnetic field is operable to deliver power and in-band data to the headset and (ii) produce an alternating current ("AC") power signal based on the alternating electromagnetic field, wherein the NFC-WC receiver antenna is positioned proximate to or within the headset;

a power conditioning system operable to (i) receive the AC power signal, (ii) convert the AC power signal to a DC power signal, and (iii) provide the DC power signal to, at least, a load associated with the headset;

a receiver control system;

a controller capacitor electrically connected in series with a data input of the receiver control system; and a voltage isolation circuit comprising:

a first isolation capacitor electrically connected to the NFC-WC receiver antenna and operable to receive the AC power signal; and a second isolation capacitor electrically connected in series with respect to the first isolation capacitor and operable to provide the AC power signal to the power conditioning system, wherein the voltage isolation circuit is electrically connected to the controller capacitor at a node between the first isolation capacitor and the second isolation capacitor, wherein the controller capacitor is operable to (i) receive the AC power signal from the voltage isolation circuit, the AC power signal having a range of voltages and including the in-band data, (ii) regulate the AC power signal to generate a scaled AC power signal having a reduced range of voltages while maintaining the in-band data, (iii) provide the in-band data, in-band of the scaled AC power signal, to the data input of the receiver control system via the controller capacitor; and (iv) isolate the reduced range of voltages of the scaled AC power signal at the receiver control system from a load voltage at the load associated with the headset; and a charging station comprising:

an NFC-WC transmitting antenna operable to (i) produce the alternating electromagnetic field and (ii) couple with the NFC-WC receiver antenna via the alternating electromagnetic field; and a housing comprising at least a support arm and a support base, wherein the NFC-WC transmitting antenna is positioned proximate to or within one or more of the support arm, the support base, and combinations thereof, and wherein the support arm is configured to retain the headband and position the NFC-WC receiver antenna to receive the power and the in-band data from the NFC-WC transmitting antenna.

12. The NFC-WC system of claim 11, wherein the NFC-WC receiver antenna couples at an operating frequency in a range of about 13.553 MHz to about 13.567 MHz.

13. The NFC-WC system of claim 11, wherein an output power of the NFC-WC transmitting antenna is greater than about 1 Watt.

14. The NFC-WC system of claim 11, wherein the at least one earcup includes at least one electroacoustic transducer.

15. The NFC-WC system of claim 14, wherein the at least one electroacoustic transducer comprises one or more of a speaker and a microphone.

16. The NFC-WC system of claim 11, wherein the at least one earcup is configured as one of an on-ear earcup and an around-ear earcup.

17. The NFC-WC system of claim 11, wherein the at least one earcup includes a first earcup and a second opposed earcup.

18. A wireless power transfer system comprising:
a wireless headset for use with an electronic device comprising:
a headband,
at least one earcup, and
a receiver antenna operable to (i) couple with a transmitting antenna via an alternating electromagnetic field, wherein the alternating electromagnetic field is operable to deliver power and in-band data to the wireless headset and (ii) produce an alternating current ("AC") power signal, wherein the receiver antenna is positioned proximate to or within the wireless headset;
a power conditioning system operable to (i) receive the AC power signal, (ii) convert the AC power signal to a DC power signal, and (iii) provide the DC power signal to, at least, a load associated with the wireless headset;
a receiver control system;
a controller capacitor electrically connected in series with a data input of the receiver control system; and
a voltage isolation circuit comprising:
a first isolation capacitor electrically connected to the receiver antenna and operable to receive the AC power signal; and a second isolation capacitor electrically connected in series with respect to the first isolation capacitor and operable to provide the AC power signal to the power conditioning system, wherein the voltage isolation circuit is electrically connected to the controller capacitor at a node between the first isolation capacitor and the second isolation capacitor, and
wherein the controller capacitor is operable to (i) receive the AC power signal from the voltage isolation circuit, the AC power signal having a range of voltages and including the in-band data, (ii) regulate the AC power signal to generate a scaled AC power signal having a reduced range of voltages while maintaining the in-band data, (iii) provide the in-band data, in-band of the scaled AC power signal, to the data input of the receiver control system via the controller capacitor; and (iv) isolate the reduced range of voltages of the scaled AC power signal at the receiver control system from a load voltage at the load associated with the wireless headset; and
a charging base configured to charge the wireless headset, the charging base comprising:
a transmitting antenna operable to (i) produce an alternating electromagnetic field and (ii) couple with the receiver antenna via the alternating electromagnetic field, and
a housing comprising a support arm and a base, wherein the transmitting antenna is positioned proximate to or within one or more of the support arm, the base, and combinations thereof, and wherein the support arm is configured to retain the headband of the wireless headset and position the receiver antenna to receive the power and the in-band data from the transmitting antenna.

19. The wireless power transfer system of claim 18, wherein the receivier antenna couples at an operating frequency in a range of about 13.553 MHz to about 13.567 MHz.

20. The wireless power transfer system of claim 18, wherein an output power of the transmitting antenna is greater than about 1 Watt.

\* \* \* \* \*